United States Patent [19]
Sadri et al.

[11] Patent Number: 5,213,460
[45] Date of Patent: May 25, 1993

[54] HIGH STRENGTH BLIND BOLT WITH UNIFORM HIGH CLAMP OVER AN EXTENDED GRIP RANGE

[75] Inventors: Shahriar M. Sadri, San Clemente; Keith D. Nordyke; Mark R. Plunkett, both of Irvine, all of Calif.

[73] Assignee: Huck International, Inc., Irvine, Calif.

[21] Appl. No.: 888,795

[22] Filed: May 27, 1992

Related U.S. Application Data

[63] Continuation-in-part of Ser. No. 705,447, May 24, 1991, and a continuation-in-part of Ser. No. 742,866, Aug. 9, 1991, abandoned.

[51] Int. Cl.$^5$ .................................... F16B 13/04
[52] U.S. Cl. ....................................... 411/43; 411/42; 411/55; 411/70; 411/361
[58] Field of Search ............... 411/43, 44, 70, 361, 411/55, 34, 36, 37, 38, 39, 40, 41, 42, 54

[56] References Cited

U.S. PATENT DOCUMENTS

| | | |
|---|---|---|
| 2,061,629 | 11/1936 | Huck . |
| 2,099,678 | 11/1937 | Curtis . |
| 2,114,493 | 4/1938 | Huck . |
| 2,282,711 | 5/1942 | Eklund . |
| 2,527,307 | 10/1950 | Huck . |
| 2,765,699 | 10/1956 | LaTorre . |
| 2,795,989 | 6/1957 | Koenig . |
| 2,887,003 | 5/1959 | Brilmyer . |
| 2,905,045 | 9/1959 | Vance . |
| 3,107,572 | 10/1963 | Orloff . |

(List continued on next page.)

FOREIGN PATENT DOCUMENTS

| | | |
|---|---|---|
| 1300950 | 7/1962 | France . |
| 2016106 | 9/1979 | United Kingdom ........... 411/42 |

OTHER PUBLICATIONS

The Huck BOM ® Fastening System, High strength blind fasteners for structural applications, ©1987 Huck Manufacturing Company.
TAU BOLT ® FASTENER, CARBON STEEL 3BL, Huck Manufacturing Company.
TAU BOLT ® FASTENER, ALLOY STEEL BL, Huck Manufacturing Company.

*Primary Examiner*—Rodney M. Lindsey
*Attorney, Agent, or Firm*—Harness, Dickey & Pierce

[57] ABSTRACT

A high strength, high clamp blind bolt for fastening structural workpieces, which blind bolt has a core pin with a blind side head and a plurality of locking grooves or threads, a high stand-off collar adapted to be swaged into the locking grooves or a nut adapted to be threaded onto the pin threads, a compression frangible main sleeve structure and an expandable, short fixed length blind side sleeve structure; the blind bolt is set by a relative axial force applied to the pin which forces the short blind sleeve structure against the main sleeve structure causing the blind side sleeve to expand and form a blind side structural load bearing blind head; the relative axial force can be applied by pulling in a swage configuration or by torque in a threaded configuration; the core pin head acts on the main sleeve structure to cause a frangible portion to shear and reduce the main sleeve structure length after which the blind head engages the blind side of the workpieces; the high stand-off collar is then swaged into the pin lockgrooves or the nut is threaded further onto the core pin with none of the clamp load developed being shared by the collapsed main sleeve structure resulting in a fastener having a high, uniform workpiece clamp load, a high, uniform tensile strength, and a fixed, short back side protrusion over a wide grip range.

77 Claims, 7 Drawing Sheets

U.S. PATENT DOCUMENTS

| | | |
|---|---|---|
| 3,129,630 | 4/1964 | Wing et al. . |
| 3,136,204 | 6/1964 | Reynolds . |
| 3,202,036 | 8/1965 | Simko . |
| 3,222,977 | 12/1965 | Vaughn . |
| 3,236,143 | 2/1966 | Wing ................................. 411/34 |
| 3,262,353 | 7/1966 | Waeltz et al. . |
| 3,277,771 | 10/1966 | Reynolds . |
| 3,311,147 | 3/1967 | Walker . |
| 3,345,900 | 10/1967 | Villo . |
| 3,377,907 | 4/1968 | Hurd . |
| 3,515,028 | 6/1970 | Patton ................................. 411/70 |
| 3,643,544 | 2/1972 | Massa . |
| 3,657,956 | 4/1972 | Bradley et al. ................. 411/43 |
| 3,786,612 | 1/1974 | Baker . |
| 3,878,760 | 4/1975 | Jeal et al. . |
| 4,089,247 | 5/1978 | Dahl et al. . |
| 4,168,650 | 9/1979 | Dahl et al. . |
| 4,203,346 | 5/1980 | Hall et al. . |
| 4,289,060 | 9/1981 | Emmett . |
| 4,289,061 | 9/1981 | Emmett . |
| 4,293,259 | 10/1981 | Liebig ............................. 411/38 X |
| 4,312,613 | 1/1982 | Binns . |
| 4,364,697 | 12/1982 | Binns . |
| 4,370,081 | 1/1983 | Briles . |
| 4,376,604 | 3/1983 | Pratt . |
| 4,451,189 | 5/1984 | Pratt . |
| 4,457,652 | 7/1984 | Pratt . |
| 4,579,491 | 4/1986 | Kull . |
| 4,627,775 | 12/1986 | Dixon . |
| 4,659,271 | 4/1987 | Pratt . |
| 4,659,272 | 4/1987 | Pratt . |
| 4,699,552 | 10/1987 | Jeal . |
| 4,752,169 | 6/1988 | Pratt . |
| 4,772,167 | 9/1988 | Beals . |
| 4,813,834 | 3/1989 | Smith . |
| 4,815,906 | 3/1989 | Binns . |
| 4,832,548 | 5/1989 | Strobel . |
| 4,865,499 | 9/1989 | Lacey . |
| 4,867,625 | 9/1989 | Dixon . |
| 4,877,363 | 10/1989 | Williamson et al. . |
| 4,900,205 | 2/1990 | Sadri . |
| 4,919,577 | 4/1990 | Binns . |
| 4,921,384 | 5/1990 | Nordyke . |
| 4,950,115 | 8/1990 | Sadri . |
| 5,006,024 | 4/1991 | Siebol . |
| 5,108,238 | 4/1992 | Ewing . |

HIGH STRENGTH BLIND BOLT WITH UNIFORM HIGH CLAMP OVER AN EXTENDED GRIP RANGE

The present invention is a continuation-in-part of copending United States patent applications for High Strength Blind Bolt filed May 24, 1991, under Ser. No. 705,447 pending and High Strength Blind Bolt With Uniform High Clamp Over An Extended Grip Range filed Aug. 9, 1991 under Ser. No. 07/742,866 now abandoned.

BACKGROUND OF THE INVENTION

The present invention relates to multi-piece fastener more particularly to a high strength blind bolt using a lockbolt like swaged construction and providing a high final clamp load of workpieces secured together and further relates to such blind fasteners particularly adapted for constructions utilizing box beams or columns, bridges and the like.

The fastener of the present invention relates generally to multi-piece blind bolt fasteners which include a main sleeve, an expandable sleeve and a pin wherein the expandable sleeve is moved axially relative to the main sleeve and is expanded radially thereover to form a blind head in response to a relative axial force applied via the pin. In this regard the blind bolt of the present invention bears a general resemblance to a threaded blind fastener of the type shown in U.S. Pat. No. 3,643,544 issued Feb. 22, 1972 to Joseph H. Massa; fasteners of this type have been sold under the trade name Visu-Lok and/or Jo-Bolt by the Monogram Aerospace Fastener Company and Voi-Shan Manufacturing Company of the United States. See also U.S. Pat. No. 3,262,353 issued Jul. 26, 1966 to R. Waeltz et al, U.S. Pat. No. 2,765,699 issued Oct. 9, 1956 to J. LaTorre, U.S. Pat. No. 2,887,003 issued May 19, 1959 to Brilmeyer and U.S. Pat. No. 3,107,572 issued Oct. 22, 1963 to Orloff. The prior blind bolt fasteners, however, have certain problems since the main sleeve absorbs a significant portion of the clamp load developed and the clamp load, tensile strength and blind side protrusion can vary with grip range. In the present invention, however, a unique blind bolt construction is provided having a wide grip range capability and in which a high strength blind head of a uniform structure is formed over this wide grip range. Thus the blind head of uniform structure will have the same blind side protrusion over the grip range.

In one form of the invention, the high strength blind fastener includes a pin, an expandable or primary sleeve, a main or secondary sleeve, and a collar adapted to be swaged into lock grooves in the pin in response to a preselected relative axial force applied between the pin and collar. In the present invention the collar initially transmits an axial force from the swage anvil of the setting tool to the main sleeve. The pin has an enlarged head which transmits an opposite axial force against the expandable sleeve by virtue of a pulling force exerted by the tool. As the axial force increases, the expandable sleeve is moved axially relative to a tapered nose portion at the blind side of the main sleeve and is radially expanded to overengage that end of the main sleeve. In prior constructions, the amount of radial expansion of the blind head was determined by the angle of the tapered nose and its distance from the blind side of the workpieces being joined. Thus the shape and hence strength of the blind head could vary depending upon the nose angle and spacing of the expandable sleeve from the blind side surface. The pin head, of course, would not engage the tapered nose portion. Unlike prior constructions, however, the pin head is adapted to engage the nose portion of the main sleeve at which time the blind head is fully defined; the expandable sleeve and tapered nose portion, however, are provided to be of limited lengths such that the blind head is substantially fully formed when the pin head engages the nose portion and before the blind head engages the blind side of the workpieces. At this stage of the installation the workpieces have not been subjected to any clamp loads between the collar and the blind head via the pin. In order to bring the blind head into engagement with the blind side surface, the main sleeve is provided with a frangible portion which will fracture at a preselected magnitude of relative axial force whereby the tapered nose portion and the fully formed blind head can freely move axially; the fully formed blind head will then be brought into contact with the blind side surface of the workpieces with no axial restraint from the now severed, freely collapsible main sleeve. Now the workpieces are pulled together by the further application and increase in the relative axial pulling force substantially solely between the blind head and the collar via the action on the pin. The force clamping the workpieces together continues to increase until the collar is swaged into the lock grooves on the pin. The final clamp load on the workpieces can be determined first by an initial magnitude of relative axial force attained just before the collar starts to be swaged onto the pin and thereafter by elongation of the collar in response to swage. The initial axial clamp force on the workpieces is sometimes referred to as "pre-load" while the final clamping force after full swage is referred to as "final clamp load". The beginning of swaging at this pre-load is sometimes referred to as "primary clinch".

As noted with the fastener of the present invention, a unique construction is provided in which the "final clamp load" is maximized; at the same time the fastener can be provided with a wide grip range and the maximized "final clamp load" will be generally uniformly available over this wide grip range. One of the limitations with prior blind fasteners formed as noted is that a part of the relative axial force applied between the pin and collar is expended on the main sleeve. This is avoided in the present invention since the main sleeve is formed such that after the expandable sleeve has been expanded to form the blind head the main sleeve collapses or is axially deformed such that the relative axial force thereafter is applied substantially solely between the blind head and the collar via the pin. Thus, high clamp loads can be attained similar to that attainable by two piece lockbolt constructions such as that shown in U.S. Pat. No. 4,921,384 for Swage Fasteners With A High Stand-Off Collar by Keith Nordyke and issued May 1, 1990. As will be seen the collar design of the '384 patent can also, be advantageously utilized with the present invention.

In another form of the invention, a controlled tension type threaded nut and bolt construction is used. As will be seen, in this embodiment a nut member is threadably engaged on a threaded portion of the shank of the pin. A splined portion is located at the terminal end of the pin shank. An installation tool has a central socket member adapted to engage the splined portion and an outer wrench member adapted to grip the nut whereby torque can be applied between the two to provide relative rotation by which the nut is threaded onto the pin to attain the desired clamp up.

Thus the high strength blind bolt of the present invention is readily adapted for use in applications in which high strength bolts, such as SAE Grade 5 (ASTM A325) or higher, are frequently used. It is also desirable for use where blind welding, nut plates and other complex construction fastening systems are used. In this regard, the blind fastener of the present invention, because of its high clamp load, is especially suited for construction of buildings, bridges, and the like where high strength and durability are of considerable importance along with the capability of providing high clamp loads of the assembled parts. Thus the blind bolt of the present invention has a high tensile strength such as SAE Grade 5 or greater and/or the tensile strength of the Japanese Grade F8T bolt or greater. In addition the unique blind bolt construction, particularly in the pull-type swage version, will have the capability of providing a final clamp load of between around 70% to around 80% of the minimum ultimate tensile load of the fastener. This is accomplished, in part, by the use of high strength ferrous materials having a high hardness.

In another form of the invention the main sleeve is of a generally straight tubular construction, i.e. without a tapered nose portion, and the blind head is formed by bulbing, through column loading, the end of the expandable sleeve which is located beyond the blind side of the workpieces. In this regard, this latter form of the invention is generally of the type shown in U.S. Pat. Nos. 2,061,628 and 2,026,629 issued Nov. 24, 1936 to Huck, U.S. Pat. No. 2,114,493 issued Apr. 19, 1938 to Huck and U.S. Pat. No. 2,527,307 issued Oct. 24, 1950 to Huck. As with the prior embodiments, however, the blind head is first formed away from the blind side surface and the main sleeve will fracture or collapse at a higher relative axial force bringing the blind head into engagement with the blind side surface with no axial restraint from the collapsed main sleeve. Formation of the blind head at a preselected location can be facilitated by band annealing the expandable sleeve at a selected location. See in this regard U.S. Pat. No. 3,253,495 issued to Orloff on May 31, 1966. As will be seen the bulbed blind head can provide an enlarged bearing surface and hence be especially useful in applications in which the workpiece openings are substantially larger than the effective diameter of the fastener.

SUMMARY OF THE INVENTION

Thus it is a general object of the present invention to provide a unique high strength blind bolt of a construction that forms a high strength blind head having a uniform, desired configuration over a wide grip range.

It is another general object of the present invention to provide a unique high strength blind bolt having a swage type construction and providing a generally uniform final clamp load over a wide grip range.

Thus it is another general object of the present invention to provide a unique high strength blind bolt utilizing a tension control type threaded construction and providing a generally uniform final clamp load over a wide grip range.

It is still another object of the present invention to provide a unique blind bolt construction for forming high strength blind fasteners having a high strength head and including a swage type construction utilizing a collar having a high stand-off capability.

It is a general object of the present invention to provide a unique high strength blind bolt which provides a high final clamp load.

BRIEF DESCRIPTION OF THE DRAWINGS

Other objects, features and advantages of the present invention will become apparent from the subsequent description and the appended claims, taken in conjunction with the accompanying drawings, in which:

DETAILED DESCRIPTION OF THE INVENTION

Figure 1:
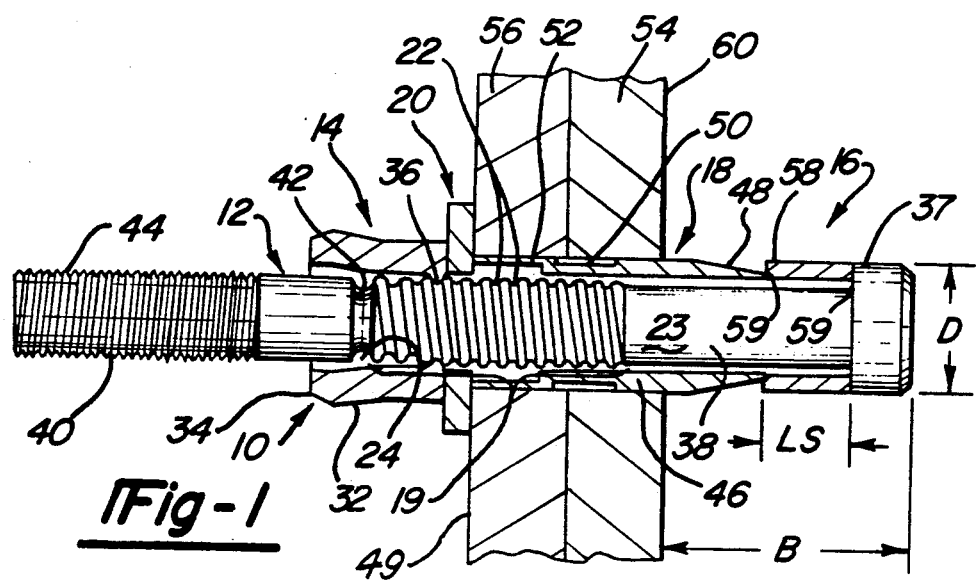
FIG. 1 is a longitudinal view with some portions shown in section of a blind fastener of the present invention including a pin, a collar, a primary or expandable sleeve, a secondary or main sleeve having a tapered nose portion and hold-off washer in assembly relationship with workpieces to be secured together.

Looking now to FIG. 1, a blind fastener 10 includes a central, core pin 12, a tubular collar 14, a primary or expandable sleeve 16, a secondary or main sleeve 18 and a hold-off washer 20. The collar 14, as shown, is of the high stand-off type shown in the '384 patent to Nordyke and hence the specific details thereof will be omitted for purposes of simplicity. The collar 14 is adapted to be swaged into lock grooves 22 in a lock groove portion 19 on an elongated shank 23 of pin 12. In the form of the invention shown in FIG. 1, the look grooves 22 are in the form of a continuous helical thread.

In some constructions the hold-off washer 20 may be eliminated and in others the collar 14 may be formed with an enlarged flange in place of such hold-off washer. As will be seen one advantage of using a separate hold-off washer 20 is that the washer 20 can be selected to be of one material and hardness to facilitate hold-off and to resist bearing loads and deformation while the collar 14 can be selected of a different material and hardness to facilitate swaging in lock grooves 22.

The collar 14 has a through bore 24 for receiving the shank 23 of pin 12. The outer surface 32 of collar 14 is generally straight at its inner end and is generally frusto-conically shaped over its radially inclined intermediate portion to define an enlarged diameter outer end. The collar 14, however, has a generally uniform wall thickness throughout its length.

The outer tapered surface of collar 14 continues its inclination generally at the same angle over the majority of the surface towards the opposite, outer end portion of collar 14. The outer surface of the outer end portion terminates in a stand-off chamfer 34. The magnitude of radially compressive force applied by a swage anvil of an installation tool in swaging the collar 14 onto pin 12 is determined in part by the angle of the stand-off chamfer 34, which transfers load axially and radially for a given applied force via the anvil. The installation tool and swage anvil can be of a construction generally known in the art and hence the details thereof have been omitted for purposes of simplicity.

As noted in the '384 patent to Nordyke the collar 14 because of the radially outwardly tapered or conical shape of its shank will provide the desired stand-off but in addition, because of its generally uniform wall thickness, will provide a generally uniform fill of the lock grooves 22 of pin 12 without excessive necking of the pin 12 and hence with minimal distortion of the lock grooves 22.

The collar 14 is provided with a limited female thread 36 located in a straight portion of the bore 24 at the inner end of collar 14. The limited female thread 36 is adapted to threadably engage the threaded lock groove portion 19 of pin 12 to hold the components of fastener 10 together in the assembled relationship as shown in FIG. 1. In this regard a construction could be utilized such as that shown in U.S. Pat. No. 4,867,625 by Richard Dixon for Variable Clamp Fastener and Method issued Sept. 19, 1989. Similarly, a construction could be used such as that shown in the U.S. Patent to Walter Smith No. 4,813,834, issued Mar. 21, 1989. Both of the latter patents can be considered as prior art to the present invention.

The pin member 12 has an enlarged head 37 at one end of pin shank 23. The pin shank 23 has a relatively smooth portion 38 leading to the threaded lock groove portion 19; a reduced diameter pintail portion 40 is formed with a plurality of pull grooves 44 and is connected to lock groove portion 19 via an annular breakneck groove 42. The breakneck groove 42 is of a reduced cross-sectional area which is designed to fracture at a predetermined axial load.

The expandable, primary sleeve 16 is of a generally tubular shape having a generally uniform inside and outside diameter.

The secondary or main sleeve 18 has a shank portion 46 with an outer surface of generally constant maximum outside diameter D (see FIG. 5); a tapered nose portion 48 is located at the inner end of shank portion 46. The tapered nose portion 48 is formed with an angle A with a line parallel with the axis X of the fastener 10. As will be seen, the unique construction of the fastener 10 permits the selection of a wide range of angles A from between around 12° to around 20°. The main sleeve 18 has a generally uniform diameter through bore 55 terminating at its outer end in an enlarged diameter counterbore 57 defining a frangible portion 51.

The shank portion 46 of secondary sleeve 18 extends through aligned openings 50 and 52 in a pair of workpieces 54 and 56, respectively, with the outer surface 49 of workpiece 56 engaged by the hold-off washer 20. The outside diameter D of shank portion 46 of secondary sleeve 18 is selected to fit through the aligned openings 50 and 52 with a clearance fit. In this regard the diameter of pin head 37 and the outside diameter of the expandable primary sleeve 16 are generally the same, i.e. diameter D, such that each can also be accepted through the openings 50 and 52 in a clearance relationship.

The shank portion 46 of main sleeve 18 has an annular groove 53 formed in its outer surface adjacent to the frangible portion 51 which defines a reduced diameter portion 63. The outside diameter of groove 53 should be less than or equal to the inside diameter D1 of counterbore 57. An annular, frangible rib or web 61 connects the frangible portion 51 in an axially in-line and radially offset position with the groove 53. As will be seen the frangible rib 61 is selected to be of sufficient strength to accept the magnitude of relative axial force required to move the expandable sleeve 16 over the tapered nose portion 48 until the pin head 37 engages the nose portion 48 and to thereafter sever permitting the reduced diameter portion 63 to move within the frangible portion 51, i.e. the frangible portion 51 can move axially into the space defined by the groove 53. In this regard, it should be noted that the compression of the nose portion 48 against the smooth shank portion 38 of the pin 12 could be such that fracture of the rib 61 could occur with the pin head 37 slightly spaced from the nose portion 48. The length of this space is minimal being around the wall thickness of the expandable sleeve 16.

Thus to set the fastener 10, a relative axial force is exerted by an installation tool (not shown) between the pin member 12 and relative to the collar 14, secondary sleeve 18 and expandable sleeve 16.

Figure 2:
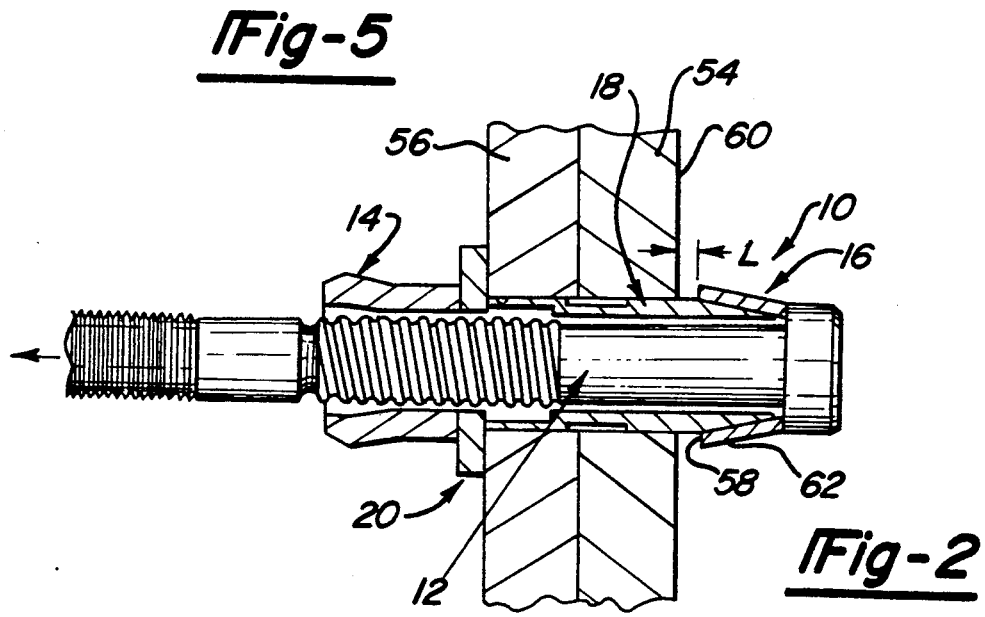
FIG. 2 is a view similar to FIG. 1 showing the blind fastener after the expandable sleeve has been axially moved over the tapered nose portion and has been radially expanded to define a blind head.
Figure 3:
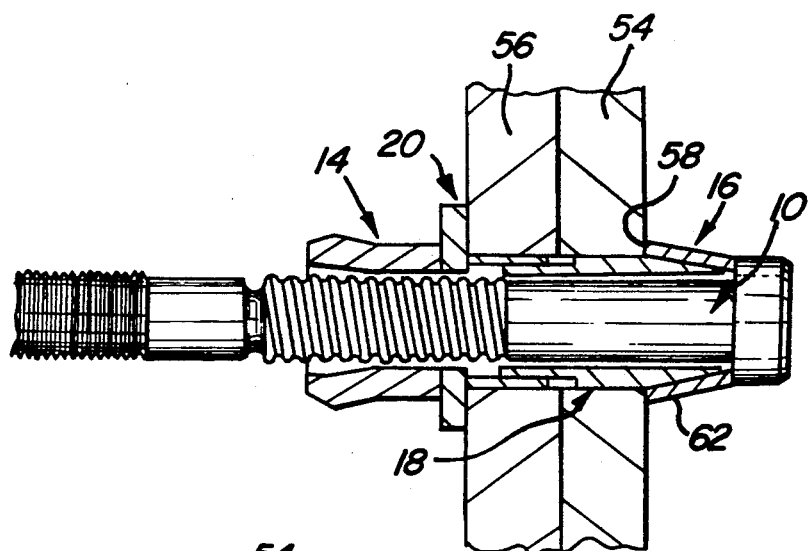
FIG. 3 is a view similar to FIGS. 1 and 2 showing the blind fastener after the blind head has been formed and the frangible portion of the main sleeve has been fractured permitting the nose portion to move axially relative to the remainder of the expansion sleeve.

The free end 58 of expandable sleeve 16 engages the tapered nose portion 48 on secondary sleeve 18. The inside diameter of sleeve 16 has a chamfer 59 at free end 58 at an angle substantially the same as that of nose portion 48. The chamfer 59 is slight, however, reducing the wall thickness at free end 58 by no more than around 25%. In this regard chamfer 59 is provided at both ends of the sleeve 16 whereby either end can serve as the free end 58 thereby simplifying assembly. Thus as expandable sleeve 16 is moved axially it overengages the surface of the tapered nose portion 48 and is radially expanded. At the same time, as the pin 12 begins to move axially through the collar 14, the limited collar thread 36 will shear or deform sufficiently to permit the pin 12 to move freely through the collar 14. As the relative axial force is thus applied, the expandable sleeve 16 will be moved axially relative to the secondary sleeve 18 over the tapered nose portion 48 until the pin head 37 engages the nose portion 48. In this position the expandable sleeve 16 will have been radially expanded to fully define the blind head 62, at a point spaced from the blind side surface 60. This is shown in FIG. 2. As the relative axial force increases the frangible rib 61 fractures permitting the nose portion 48 to move generally freely axially relative to the frangible portion 51 of the sleeve 18. The axial width W of groove 53 is selected to be at least equal to the distance L from the free end 58 of expandable sleeve 16 to the blind side surface 60 of workpiece 54 after the blind head 62 is fully formed as shown in FIG. 2. Thus the blind head 62 is moved into engagement with the blind side surface 60 of workpiece 54 as shown in FIG. 3. Now the relative axial load is applied substantially solely between the collar 14 and the pin 12 via the pin head 37 and the blind head 62.

Figure 4:
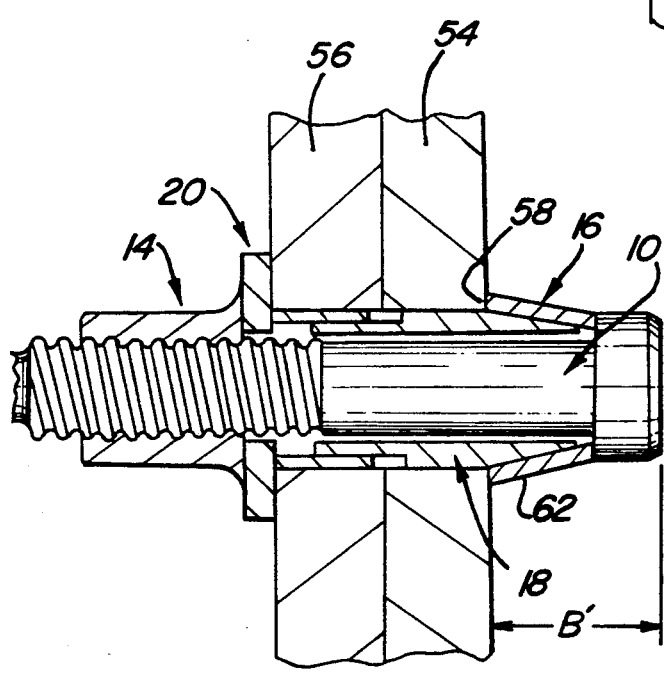
FIG. 4 is a view similar to FIGS. 1-3 showing the blind fastener after it has been finally set.

In this condition however, the swaging or deformation of the material of the collar 14 into the pin lock grooves 22 has not yet started and, hence, the pin 12 and collar 14 can now respond as a typical pull type swage type fastener. The relative axial load increases pulling the workpieces 54 and 56 together and swaging the material of collar 16 into the lock grooves 22. Upon completion of swage, the axial load is increased until fracture of the breakneck groove 42 whereby the pintail portion 40 is severed and the installation is completed as shown in FIG. 4.

In prior constructions the angle A of nose portion 48 has been significant with regard to the strength of the resultant blind head and with regard to the grip range of the particular fastener. In addition the taper angle A has been significant both with regard to blind side clearance both in a preset condition and in the final installed condition.

It is desirable that the blind head 62 be finally formed with the free end 58 extending generally parallel to the axis X of the fastener 10. A large bell shaped or conical configuration would locate the free end 58 in an orientation which is non-parallel to the axis X; thus such a blind head would have less resistance to column loading and hence its load capacity would be reduced. To a great extent in the past the formation of the blind head 62 to the desired parallel construction was dictated by the magnitude of the angle A of nose portion 48. The larger the angle A the more the outer end 58 will be flared radially outwardly as it moves over the nose portion 48. This could require a greater blind side distance from blind side surface 60 before the outer end 58 could move sufficiently radially inwardly to assume the desired generally parallel orientation with axis X. This was a factor in order to permit such fasteners to be used over a reasonable grip range. With such prior constructions the expandable sleeve by necessity would more past the tapered nose portion in grip conditions from maximum to minimum. But with the present invention the length LS of the expandable sleeve 16, generally, need be no longer than the tapered length LA of tapered nose portion 48 since the tapered nose portion 48 will in a sense be moved out of the way after it has accomplished its purpose of forming the blind head.

The width W of the groove 53 can be selected to define the grip range of the fastener 10. In this regard, the fastener 10 is constructed such that in the maximum grip condition the free end 58 of the fully formed blind head 62 will be spaced from the blind side surface 60 of workpiece 54 a slight distance L (see FIG. 2). This is to provide sufficient spacing to ensure fracturing of the rib 61 and movement of the nose portion 48 into the frangible portion 51. With this relationship set, the width W can be selected to define the minimum grip and hence grip range of the fastener 10. Thus the width W of the groove 53 should be at least slightly greater than the grip range of the fastener 10 in order to assure complete travel of the nose portion 48 into the frangible portion 51 in the minimum grip condition. At the same time, the axial length $L_X$ of counterbore 57 must also be sufficient such that in the minimum grip condition it will fully receive the reduced diameter portion 63 without engagement of its end 69 with the washer 20. In all cases throughout the grip range, then, the main sleeve 18 will have collapsed or deformed via fracturing of the rib 61 whereby the main sleeve 18 will no longer be in a load bearing relationship with the blind head 62 and/or the pin head 37; thus in this collapsed condition the main sleeve 18 will have no effect on the magnitude of the final clamp load attainable. With no loss of clamp load through the main sleeve 18, the final clamp load will be generally uniform throughout the grip range. Thus the construction of the present invention permits the selection of a large grip range with a resultant uniform clamp load merely by selection of the width W and length $L_X$. In this regard the "grip range" of a fastener is defined by the difference between the minimum and maximum total thickness of workpieces that a single fastener can secure together. It can be seen that the fastener of the present invention will be capable of generally uniformly delivering rated values, i.e. tensile, clamp load, etc., within a large grip range.

As previously noted a principal objective of the present invention is to provide a blind fastener having very high strength characteristics not present in any other blind fastener to be used in applications in which conventional high strength bolts have been used. In addition to providing a blind head 62 which geometrically has a high resistance to column buckling, the materials of the fastener 10 are selected to be of high strength and hence high hardness. Thus in one form of the invention the expandable, primary sleeve 16 can be made of a relatively high strength, ductile material such as a 4130 steel of aircraft quality having a Rockwell hardness of between around 28Rc to around 32Rc. In addition it has been found advantageous to utilize 4130 aircraft quality steel having a nickel content greater than around 0.17% by weight; the related specification for the 4130 aircraft quality steel provides for a maximum nickel content of 0.25% by weight. It appears that the additional nickel sufficiently improves the ductility of the expandable sleeve 16 such that axial splitting of the sleeve wall from radial expansion and from high hoop stresses in installation is inhibited. In this regard with a fastener 10 with expandable sleeve 16 constructed of the materials noted and having a sleeve diameter D of around 0.685 inches, the wall thickness was around 0.102 inches to assure that the blind head 62 was of adequate strength; in the metric system the noted dimensions would generally apply to a 16 millimeter fastener.

It should also be noted that the expandable sleeve 16, which is constructed of a high strength material can be provided to be of a minimum length LS which is slightly longer than the length LA of the tapered nose portion 48, i.e. by around the thickness of the expandable sleeve 16. The slight extra length of LS is provided to compensate for the possible slight spacing between the pin head 37 and the nose portion 48 at fracture of rib 61 and hence to provide that the free end 58 of the expandable sleeve 16 will terminate at the end or slightly beyond the end of the tapered portion 48. This is to assure that the blind head 62 is formed generally uniformly to the desired final diameter. This expandable sleeve 16 of minimum length can accommodate the entire grip range which as noted can be selected to be large. With the length LS of sleeve 16 at a minimum the resistance of columnar buckling is increased thereby providing a blind head with a high strength capability.

The strength of the pin member 12 is very significant and hence the pin member 12 can be constructed of a ferrous or other material having a Rockwell hardness of between around 39Rc to around 42Rc or higher such as a 4130 steel of aircraft quality. At the same time the collar 14 can be constructed of a ferrous or other material such as a 1008, 1010, or 1018 low carbon steel having a Rockwell hardness of between around 68Rb to around 78Rb. The secondary or main sleeve 18 can be constructed of a ferrous or other material such as a 4130 steel having a Rockwell hardness of between around 43Rc to around 47Rc.

The hold-off washer 20 can be constructed of a ferrous or other material such as a high carbon steel having a Rockwell hardness of between around 43Rc to around 47Rc.

The hold-off washer 20 can be constructed of a ferrous or other material such as a high carbon steel having a Rockwell hardness of between around 40 Rc to around 45 rc. The washer 20 is thus harder than the collar 14 and generally of equal hardness to the secondary sleeve 18 and hence can effectively resist the extrusion of one into the other. In one form of the invention the washer 20 had a thickness of around 0.100 inches where the secondary sleeve 18 had an outside diameter D of around 0.685 inches with the expandable sleeve 16 having the dimensions previously noted. At the same time a dry film lubricant such as molydisulphide is used to reduce friction between the moving parts. A molydisulphide such as Ecoa Lub 642 by Everlube has been found satisfactory.

One of the advantages of the use of a minimum length LS of the expandable sleeve 16 is a significant reduction in blind side clearance B (see FIG. 1) resulting in part from a reduction in the blindside protrusion of the end of the nos portion 48 of main sleeve 18 from blind side surface 60 which is required to form the blind head 62. Also the final installed blind side clearance B' can be minimized (see FIG. 4). In addition with the present invention the grip range of the fastener will be greater than prior constructions having the same nose angle A. All of the above can be accomplished while still meeting the desired strength characteristics for the fastener 10.

With the use of high strength, high hardness materials stress concentrations can be a factor in the load capability and overall performance of the fastener. Thus it is desirable to minimize stress concentrations at high load areas.

As noted, it is desirable to reduce the stress concentrations such as that at the juncture between the inner surface 65 of the pin head 37 and smooth shank portion 38. This is accomplished by providing a generally streamlined shape to the fillet 71 located at that juncture. Such a streamlined shape is approximated by utilizing a double radius of R1 and R2 (see FIG. 1A). The larger radius R1 is generally tangent to the shank portion 38 and is around twice the radius R2 which is generally tangent to the inner surface 65 of pin head 37. For a pin 12 having a pin shank portion 38 with a diameter of around 0.450 inches and a pin head 37 having an outside diameter of around 0.685 inches a radius R1 of 0.102 inches and a radius R2 of 0.050 inches was found satisfactory in reducing the stress concentration ratio at fillet 71. In this context the fillet 71 extended for an axial distance d of around 0.080 inches.

It should also be noted that the slight chamfers 59 on the inside diameter at the opposite ends of expandable sleeve 16 plus its inner radial clearance with the smooth pin shank portion 38 assures that the confronting end of expandable sleeve 16 will not engage the fillet 71.

In addition to the reduction of the stress concentration at fillet 71, as noted, the lock grooves 22 are formed to be generally shallow in depth and to have roots of the generally streamlined contour. Thus the lock grooves 22 could utilize the groove shape and concepts of U.S. Pat. No. 5,090,852 by Richard D. Dixon for High Strength Fastener and Method filed on Apr. 20, 1988 and issued on Feb. 25, 1992. With this root construction, the stress concentration at the lock grooves 22 is also reduced.

As noted, the enlarged diameter outer portion of tapered collar 14 will provide stand-off resistance to initial swage, i.e. primary clinch. The interaction of the swage surface of the swage anvil and the angle of the stand-off chamfer 34 are such as to assist in providing a preselected stand-off whereby initiation of swaging of the collar 14 into the lock grooves 22 will not begin until that lower magnitude of relative axial force has been attained which is sufficient to form the blind head 62.

As noted in the '852 Dixon patent, the pin grooves 22 can be of a shallow helical construction with a generally streamlined shape whereby a high strength construction can be achieved having a desirable high clamp load. With the noted shallow groove structure, the volume of the collar 14 was selected to generally provide 'overpacking', i.e., a volume of material to provide substantially more volume of collar material for filling pin grooves 22 than is available within the swage envelope defined by the cavity of the swage anvil and the confronting lock grooves 22. In that construction, it has been found desirable to provide a volume of collar material which has an excess of at least around 14% to around 16%.

To enhance the strength of fastener 10 the pin grooves 22 and adjacent pin shoulders and the complementary grooves and shoulders of the swaged collar 14 can be proportioned in width relative to the respective shear strengths of the materials of pin 12 and collar 14, such that both the shoulders defined by pin grooves 22 of the pin 12 and the shoulders defined by interlock grooves of the swaged collar 14 are in incipient or simultaneous failure in shear at or above the preselected minimum ultimate design tensile load on associated workpieces 54 and 56. It is preferred that the design provide for the shoulders defined by the grooves of collar 14 to fail prior to the shoulders defined by pin lock grooves 22, i.e. the shoulders cf pin lock grooves 22 would fail in shear at approximately 110% of the tensile load at which the shoulders of collar 14 would fail. By proportioning the grooves as noted, the engaged length of pin and collar can be minimized for a given tensile load. Of course, by providing sufficient collar length, the above shear strength relationship can be maintained while providing for a tensile failure diametrically across the pin lock groove portion 19.

As noted it is desirable that the high strength fastener of the present invention provide a high final clamp load to the fastened joint. To achieve this result high installation loads including final pin break load at breakneck groove 42 are required from the installation tool. These loads, however, are generally absorbed by the tool and are thus not fully transmitted to the operator handling the installation tool. Thus the high load occurring at pin break at breakneck groove 42 is substantially absorbed by the tool by virtue of the fact that the swaged collar is tightly located within the swage anvil of the tool.

Thus it is important that the breakneck groove 42 not fail prematurely since this could result in undesirable shock loads being transmitted to the operator.

In order to assure complete swage of the collar 14 without premature pin break at breakneck groove 42, it is desirable that the difference Df in magnitude between the magnitude of relative axial force Ds to swage the collar 14 and relative axial force Db to cause pin break at breakneck groove 42 be large in order to avoid premature pin break and the undesired shock load to the operator. In one example the difference Df was around 40 percent of the pin break load Db with the swage load Ds being around 60 percent of the pin break load Db. Also in order to avoid a tensile failure in the pull grooves 44 at the high relative axial setting loads encountered it was found desirable to have the root diameter of the breakneck groove 42 relative to the root diameter of the pull grooves to be in the ratio of around 0.82:1.

With the fastener 10 installed, the swaged collar 14 will have a complementary female thread formed in its through bore 24.

Figures 1A, 5:
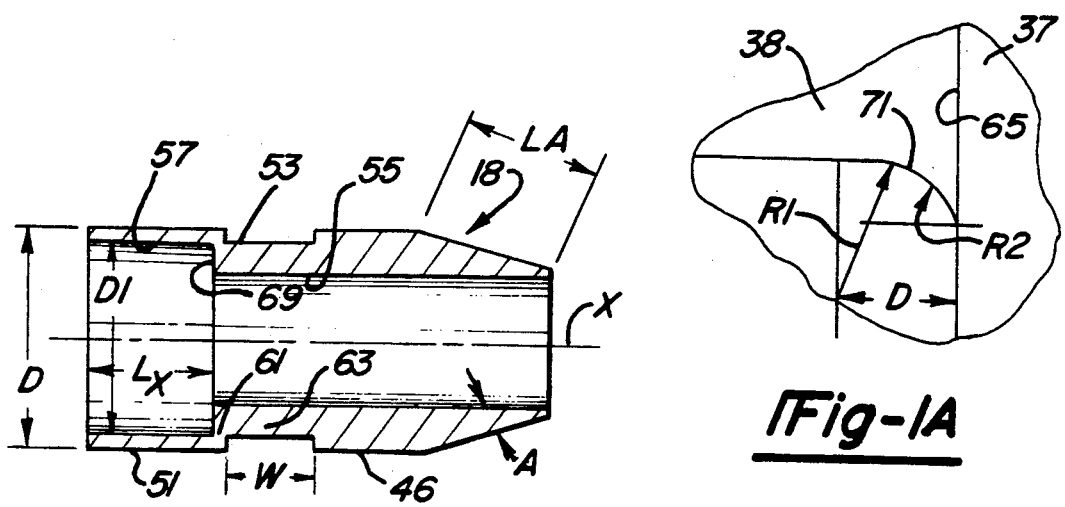
FIG. 1A is a fragmentary view to increased scale of a portion of the pin of FIG. 1 taken generally in the area of the circle 1A in FIG. 1.
FIG. 5 is a sectional fragmentary view to increased scale of the main sleeve, of the fastener of FIG. 1.
Figure 6:
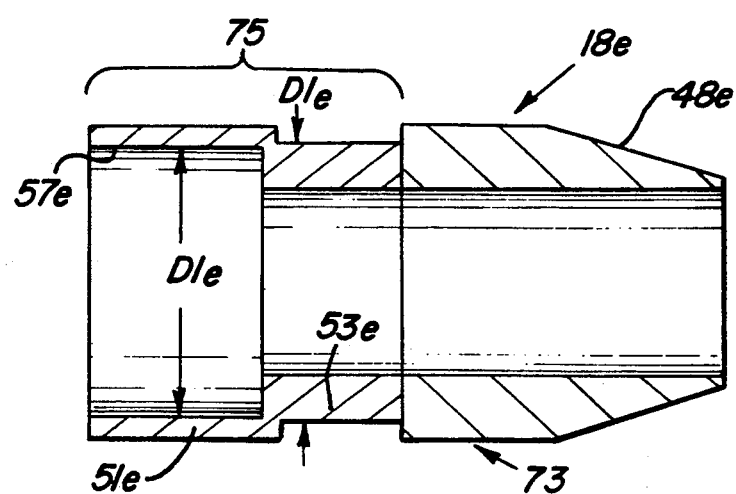
FIG. 6 is a view similar to FIG. 5 depicting a modified form of the main sleeve with a separate nose section and frangible section.

The embodiment of FIGS. 1 and 2 shows the main sleeve 18 to be of a one piece construction. However, a main sleeve of a multiple pieced construction could be used advantageously and such is shown in FIG. 6. Thus in FIG. 6 components similar to like components in the embodiment of FIGS. 1, 2 and 5 are given the same numeral designation with the addition of the subscript "e".

Thus in FIG. 6, the main sleeve 18e is shown to be substantially identical to sleeve 18 of FIG. 1 but of a two piece structure. The nose portion 48e is part of a nose shank section 73 while the frangible portion 51e is part of a separate stepped shank section 75. The shank section 75 is of a stepped construction with a reduced diameter portion 53e of an outside diameter D1e performing the function of the groove 53 of FIG. 1. At the same time the counterbore 57e is also formed to be of the diameter D1e. The functioning of the two piece main sleeve 18e would then be essentially the same as that of sleeve 18. However, the use of a separate nose shank section 73 and stepped shank section 75 could facilitate and simplify manufacturing procedures. In addition a common nose shank section 73 could be used with different lengths of stepped shank section 75 to accommodate different fastener lengths. This could not only further simplify manufacture but also reduce the inventory of the noted components.

Figure 7:
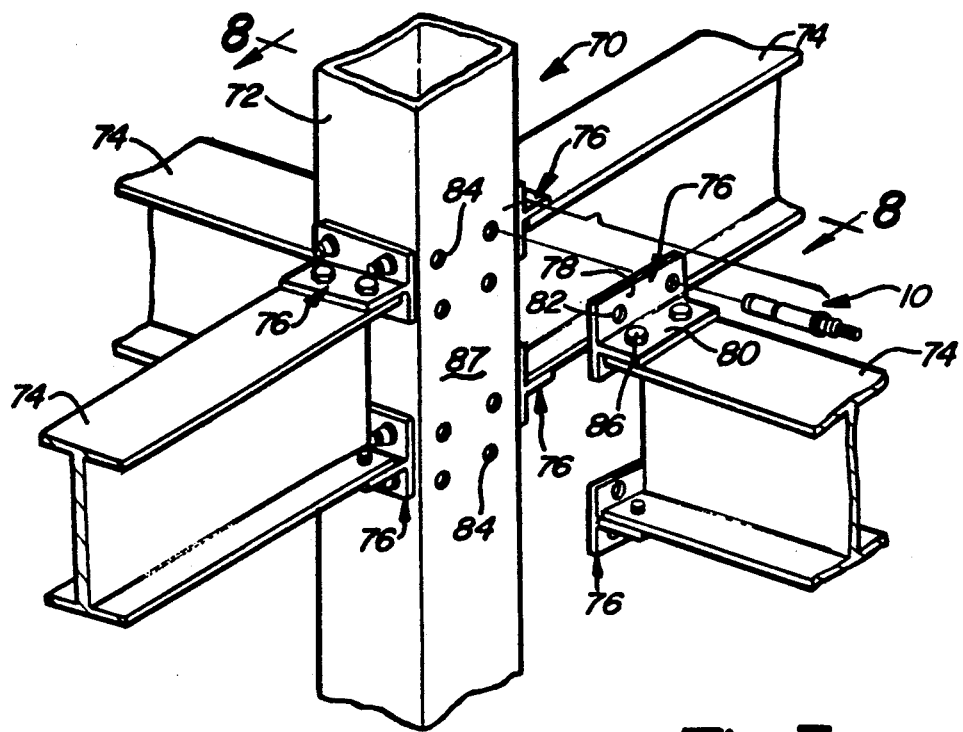
FIG. 7 is a pictorial view with some parts shown broken away and others in section depicting the blind fastener of the present invention adapted for use in a box beam/column application for securing a plurality of I-beams with one I-beam shown pre-assembled.
Figure 8:
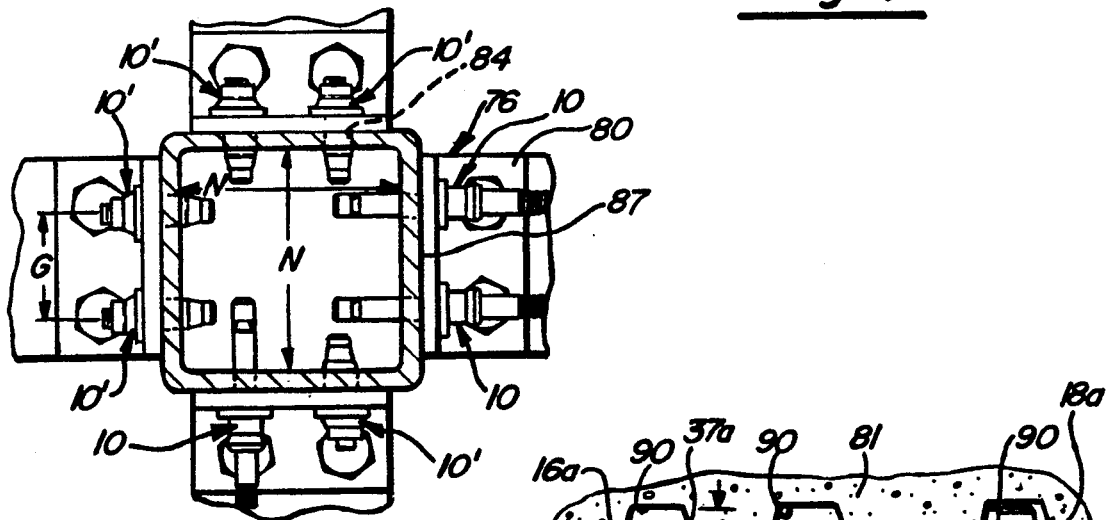
FIG. 8 is a sectional view of the structure of FIG. 7 taken generally in the direction of the arrows 8—8 in FIG. 7 but showing the one I-beam in place for assembly with some blind fasteners shown set and others shown prior to setting.

Looking now to FIGS. 7 and 8, a box beam/column construction 70 is shown and comprises a vertically mounted box beam/column 72 utilized to secure horizontally extending I-beams 74 via pairs of flanged attachment brackets 76 adapted to be secured to the box beam/column 72 by fasteners of the present invention.

With prior constructions, joints such as that shown in FIGS. 7 and 8 have required relative complex procedures and/or fastening structures such as blind welding, nut plates, and the like. With the present invention a simpler yet effective attachment structure ca be used.

Thus each of the flanged attachment brackets 76 is generally T-shaped and has a base portion 78 and a central leg portion 80 extending transversely therefrom. The base portion 78 can be provided with a plurality of bores 82 adapted to match a similar plurality of bores 84 in the adjacent wall portion 87 of the box beam/column 72. The I-beam 74 is located between the central leg portions 80 of a cooperating pair of brackets 76 and secured thereto by a plurality of fasteners 86 which can be threaded fasteners or other type of non-blind fastener. Now the blind fastener 10 of FIG. 1 is applied between the base portion 78 of bracket 76 and the wall portion 87 to secure the two elements together.

It should be noted that the box beam/column 72 can be of a standard construction having standard dimensions such that the internal distance N between walls 87 will be around 5.9 inches or around 150 millimeters. At the same time the distance G between the center lines of the receiving holes or bores 84 will be around 3.15 inches or 80 millimeters. This will then provide a limit on the blind side clearance between fasteners 10 where two or more I-beams 74 or other structures are to be attached to the box beam/column 72 at the different side walls 87 via brackets 76. FIG. 8 is a sectional view showing four I-beams 74 with brackets 76 mounted to each. In the preset condition the blind side of the fastener 10 will extend the greatest distance into the open section inside the box beam/column 72. It is desirable in such applications that the set fastener have a minimal blind side protrusion. This is shown in FIG. 8 with the set fasteners indicated as 10' and the preset fasteners indicated as 10. Thus in the present invention it is important that the blind side clearance required for the preset fastener 10 and set fastener 10' be limited and/or minimized. This is accomplished by the use of nose portion 48 and hence expandable sleeve 16 of a minimum length.

Thus in FIG. 8 with the blind side protrusion of the set fastener 10' being reduced as noted the center line distance G can be maximized such that the adjacent preset fastener 10 can be inserted proximate to but in clearance relationship with the blind side of set fastener 10'. For a secondary or main sleeve 18 of diameter D of around 0.685 inches, the primary or expandable sleeve 16 can have a length LS of from around 0.420 inches to around 0.460 inches and the blind side protrusion B would be between around 1.30 inches and 1.36 inches over the grip range of the fastener. Another advantage of the fastener 10 of the present invention in the application such as FIG. 8, is its ease of removability. Thus the set collar need only be cut-off and the remainder of the fastener pushed through and later replaced with a new fastener.

Figure 9:
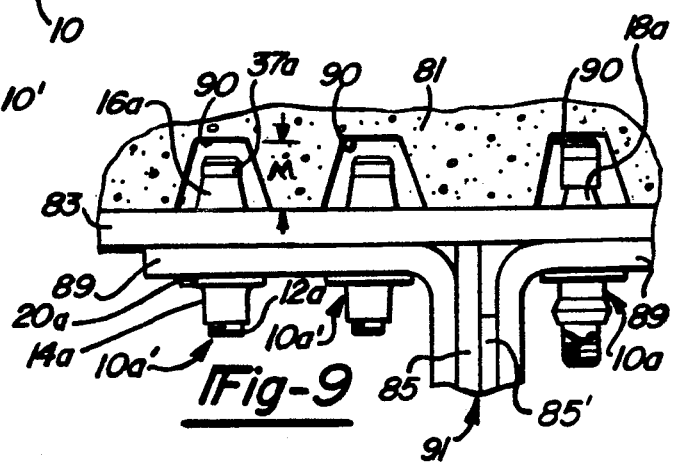
FIG. 9 is a side elevational view with some parts shown broken away and others shown in section of the present invention adapted for use in a bridge structure application.

Frequently bridges and roadways, either being newly constructed or repaired, require the attachment of beams, support brackets and the like in areas which are either generally inaccessible from one side or accessible only through relatively complex procedures. FIG. 9 illustrates a typical construction in which accessibility to one side of a structure is generally blocked. In the description of the embodiment of FIG. 9 components similar to like components in the embodiment of FIGS. 1-2 have been given the same number designation with the addition of the letter postscript "a".

Thus a concrete (or other type) road surface 81 is supported on a structure including a generally horizontal support plate 83. The support plate 83 is in turn supported by a generally T shaped vertical structure 91 defined by vertical plates 85, 85' and L-shaped brackets 89. The T-shaped structure 91 is secured to the support plate 83 by a plurality of fasteners 10a and 10a, constructed in the manner of fastener 10. The fastener 10a is shown in its pre-set condition while fasteners 10a, are shown in the set condition. Thus the fastener 10a (10a') includes a pin 12a having an enlarged pin head 37a and an expandable sleeve 16a, a main sleeve 18a, a hold-off washer 20a and a swageable collar 14a. Note that the blind side of the joint must be provided with cavities 90 which are formed by a special drilling technique with the support plate 83 in place. Here it is desirable that the depth M of the cavity 90 be maintained at a minimum. Thus the fastener 10a having a minimized blind side clearance requirement is well suited for such applications and hence the cavities 90 need be of a depth M only slightly greater than the blind side clearance B. This can be seen from the preset fastener 10a which can be configured to have the minimum blind side clearance for the maximum grip condition. While conventional bolts can be used in such applications it is only by way of complex procedures by which openings are formed in the support plate 83 to permit access to the concrete or blind side of the support plate 83.

Figure 10:
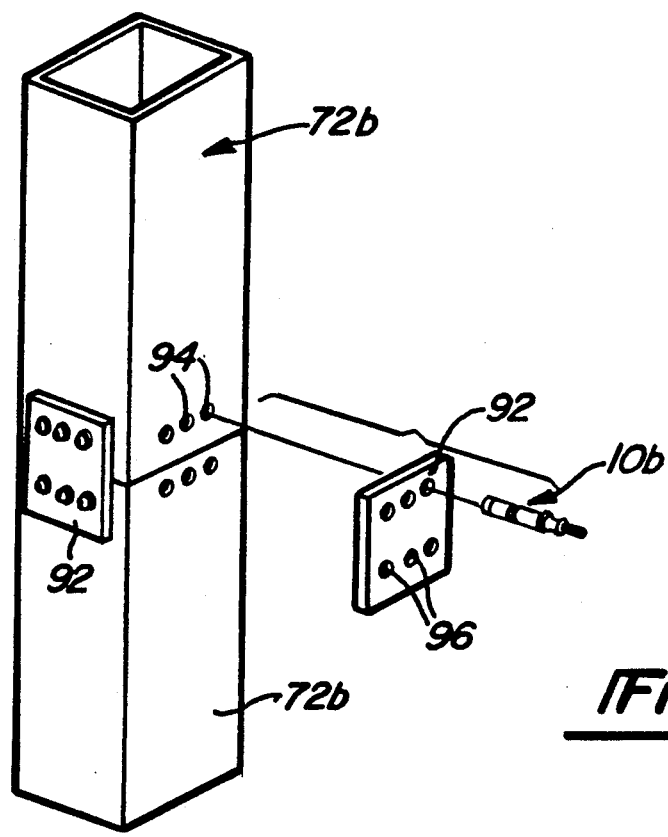
FIG. 10 is a pictorial view depicting the use of the high strength blind fastener of the present invention adapted for use in securing a pair of box beams together.

FIG. 10 depicts another box beam type construction in which the fastener of the present invention can be advantageously utilized. In the description of the embodiment of FIG. 10 components similar to like components in the embodiment of FIGS. 1-2 and 4 have been given the same number designation with the addition of the letter postscript "b".

Thus in FIG. 10 a pair of box beams 72b (similar to box beam 72 of FIG. 4) are to be secured together end-to-end by way of generally flat brackets 92. Here rows of blind fasteners 10b can be used through aligned openings 94 and 96 in the beams 72b and brackets 92 respectively to secure the beams 72b together in the end-to-end orientation shown. Other constructions would require weld nuts, nut plates, welding or other relatively complex structures and/or procedures.

Looking now to FIGS. 11-14 a modified form of the blind fastener is shown in which components similar to like components in the embodiment of FIGS. 1-5 have been given similar numeral designations with the addition of the letter postscript "c".

Figure 11:
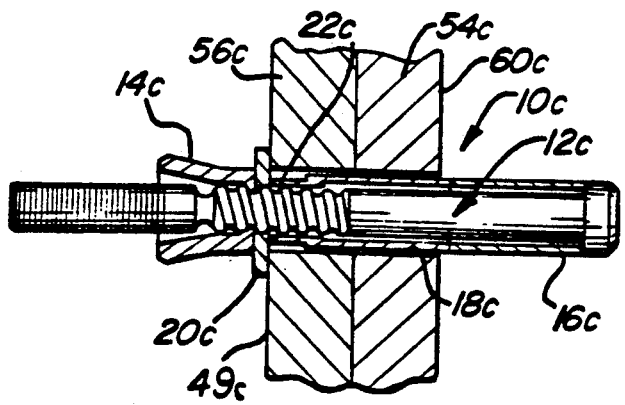
FIG. 11 is a longitudinal view similar to FIG. 1 depicting a modified form of the invention, prior to installation and in which the blind head is to be formed by bulbing through column loading.
Figure 14:
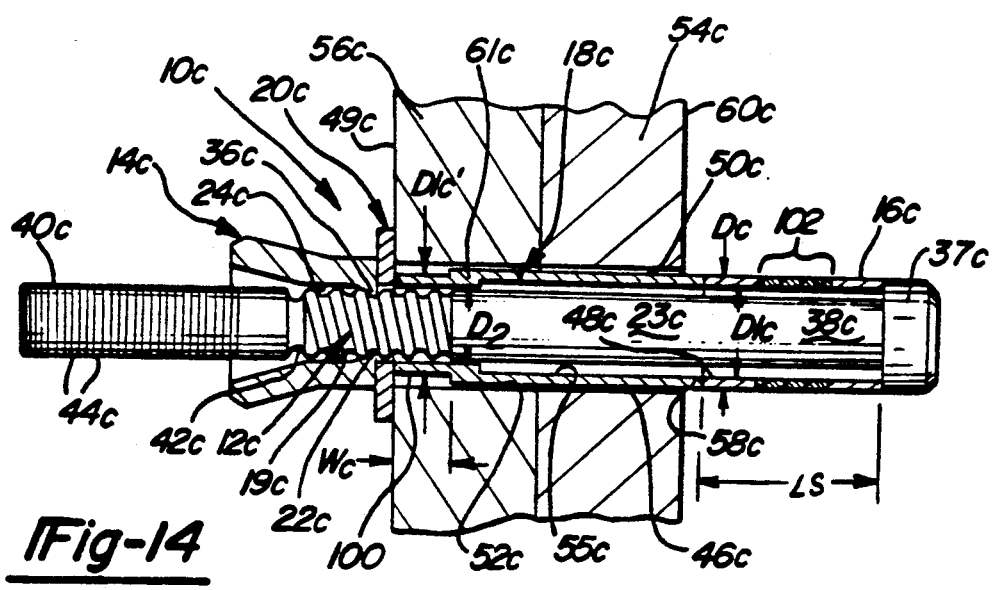
FIG. 14 is a longitudinal view to enlarged scale of the blind fastener of FIG. 11.

Looking now to FIGS. 11 and 14, a blind fastener 10c includes a central, core pin 12c, a tubular collar 14c, a primary or expandable sleeve 16c, a secondary or main sleeve 18c and a hold-off washer 20c. The pin 12c, collar 14c and hold-off washer 20c can be of a construction and material the same as pin 12, collar 14 and washer 20 of FIGS. 1-3 and hence the specific details thereof will be omitted for purposes of simplicity. Thus the collar 14c is adapted to be swaged into lock grooves 22c in a threaded lock groove portion 19c on an elongated shank 23c of pin 12c. The collar 14c has a through bore 24c for receiving the shank 23c of pin 12c.

The collar 14c is provided with a limited female thread 36c located in a straight portion of the bore 24c at the inner end of collar 14c. The limited female thread 36c is adapted to threadably engage the threaded lock groove portion 19c of pin 12c to hold the components of fastener 10c together in the assembled relationship as shown in FIG. 11.

The pin member 12c has an enlarged head 37c at one end of pin shank 23c. The pin shank 23c has a relatively smooth portion 38c leading to the threaded lock groove portion 19c; a reduced diameter pintail portion 40c is formed with a plurality of pull grooves 44c and is connected to lock groove portion 19c via an annular breakneck groove 42c. The breakneck groove 42c is of a reduced cross-sectional area which is designed to fracture at a predetermined axial load.

The expandable, primary sleeve 16c is of a generally tubular shape having a generally uniform outside diameter Dc and a generally uniform inside diameter D1c.

The secondary or main sleeve 18c has a main shank portion 46c with an outer surface also of a generally constant outside diameter Dc and a bore 55c with an inside diameter D1c, the same as expandable sleeve 16c. The main shank portion 46c terminates in an end shank portion 100 of a reduced outside diameter of a diameter D1c' for a purpose to be seen. The end shank portion 100 of main sleeve 18c has a generally uniform reduced diameter bore D2 which extends partially into bore 55c thereby defining an annular frangible rib or web 61c.

The main shank portion 46c and end shank portion 100 of secondary sleeve 18c extend through aligned openings 50c and 52c in a pair of workpieces 54c and 56c, respectively, with the outer surface 49c of workpiece 56c engaged by the hold-off washer 20c. The outside diameter Dc of main shank portion 46c of secondary sleeve 18c is selected to fit through the aligned openings 50c and 52c with a clearance fit. In this regard the diameter of pin head 37c and the outside diameter Dc of the expandable primary sleeve 16c are generally the same, i.e. diameter Dc.

The outside diameter D1c, of end shank portion 100 should be less than or equal to the inside diameter D1c of main shank portion 46c. The frangible rib 61c is selected to be of sufficient shear strength to accept the magnitude of relative axial force required to bulb the expandable sleeve 16c to form a blind head 62c and to thereafter sever permitting the reduced diameter end shank portion 100 to move within the main shank portion 46c, i.e. the end shank portion 100 can move axially into the bore 55c of main shank portion 46c.

The main sleeve 18c can be constructed of the same materials as main sleeve 18. The expandable sleeve 16c can be constructed of a hardenable material such as a low to medium carbon steel. The expandable sleeve 16c is through hardened to a Rockwell hardness of around Rb95. In order to facilitate the formation of blind head 62c at a desired location, the expandable sleeve 16c is band annealed over a section 102. The band annealed section 102 is preferably located midway along the length of the expandable sleeve 16c in order to provide the formation of the bulbed blind head 62c at this mid location. In one form of the invention the annealed section 102 was annealed to a Rockwell hardness of around Rb70.

Thus to set the fastener 10c, a relative axial force is exerted by an installation tool (not shown) between the pin member 12c and relative to the collar 14c, secondary sleeve 18c and expandable sleeve 16c.

Figure 12:
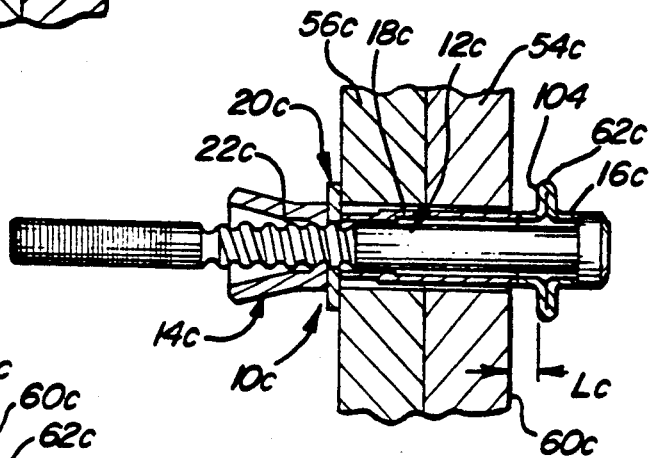
FIG. 12 is a longitudinal view of the fastener of FIG. 11 in which the blind head has been formed by bulbing away from the blind side surface of the workpieces being secured.
Figure 13:
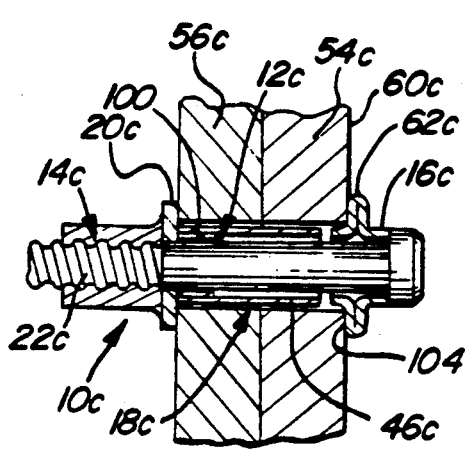
FIG. 13 is a longitudinal view of the fastener of FIG. 11 depicting the fastener after it has been set.

The free end 48c of expandable sleeve 16c engages the confronting end 58c of secondary sleeve 18c. As the relative axial force is thus applied, the expandable sleeve 16c will collapse at the band annealed section 102 folding radially outwardly to form the blind head 62c. At the same time, as the pin 12c moves axially through the collar 14c, the limited collar thread 36c will shear or deform sufficiently to permit the pin 12c to move freely through the collar 14c. In this position the expandable sleeve 16c will have been collapsed to fully define the blind head 62c, at a point spaced a distance Lc from the blind side surface 60c. This is shown in FIG. 12. As the relative axial force increases the frangible rib 61c fractures permitting the main shank portion 46c to move generally freely axially relative to the end shank portion 100 of the sleeve 18c. The axial width Wc of end shank portion 100 is selected to be at least equal to the distance Lc from the blind head surface 104 of blind head 62c to the blind side surface 60c of workpiece 54c after the blind head 62c is fully formed as shown in FIG. 12. Thus the blind head 62c is moved into engagement with the blind side surface 60c of workpiece 54c as shown in FIG. 13. Now the relative axial load is applied substantially solely between the collar 14c and the pin 12c via the pin head 37c and the blind head 62c.

Upon completion of swage, the axial load is increased until fracture of the breakneck groove 42c whereby the pintail portion 40c is severed and the installation is completed as shown in FIG. 13.

The width Wc of the end shank portion 100 can be selected to define the grip range of the fastener 10c. In this regard, the fastener 10c is constructed such that in the maximum grip condition the spacing Lc of the blind head engaging surface 104 of the fully formed blind head 62c from the blind side surface 60c of workpiece 54c is a slight distance. This is to provide sufficient spacing to ensure fracturing of the rib 61c and movement of the main shank portion 46c over the end shank portion 100. With this relationship set, the width Wc can be selected to define the minimum grip condition and hence grip range of the fastener 10c.

It should be noted that the expandable sleeve 16c, can be provided to be of a minimum length LS sufficient to assure that the blind head 62c is formed generally uniformly to the desired final diameter. This expandable sleeve 16c of minimum length can accommodate the entire grip range which as noted can be selected to be large. At the same time the bulbed blind head 62c will be of a relatively large diameter thereby providing for a large bearing area against the blind side surface 60c. The large diameter blind head 62c also permits use of the fastener 10c in applications where there is relatively large clearance between the workpiece openings 50c and 52c and the main sleeve 18c.

Note that with the construction as shown in FIGS. 11–13 a single expandable sleeve 16c could be used with a number of different lengths of fasteners such as fastener 10c, i.e. longer or shorter pins 12c and main sleeves 18c. At the same time it should be noted that, in some applications, the expandable sleeve 16c and main sleeve 18c could be made of a one piece construction. Likewise the collar 14c could be made integrally with the main sleeve 18c and also in a unitary construction with the expandable sleeve 16c. In this regard means other than the collar 14c could be utilized for locking together the pin 12c and expandable sleeve 16c with blind head 62c.

In another form of the present invention a tension control threaded type system is utilized and thus a threaded nut and bolt type construction is provided. Such a system is shown in FIGS. 15–21 where components similar to like components in the embodiment of FIGS. 1–5 have been given the same numeral designation with the addition of the letter postscript "f". Unless otherwise stated, the description of such similar components which was given in the discussion of FIGS. 1–5 shall be considered to apply to the same numbered components with the postscript "f" in FIGS. 15–21.

Figure 15:
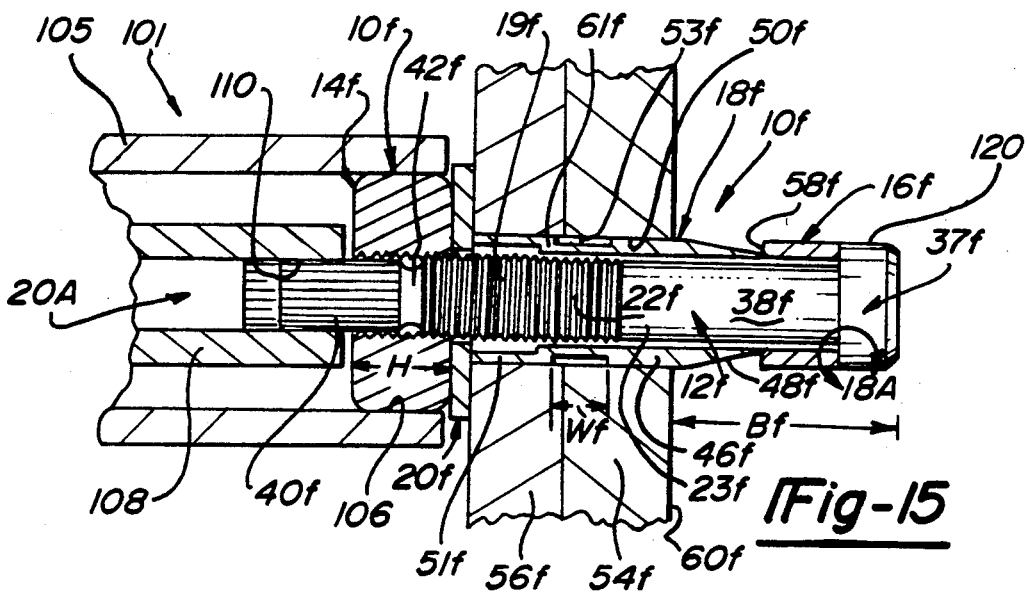
FIG. 15 is a longitudinal view similar to FIG. 1 depicting a modified form of the invention utilizing a threaded nut and bolt type construction by which the fastener is installed through applied torque.
Figure 16:
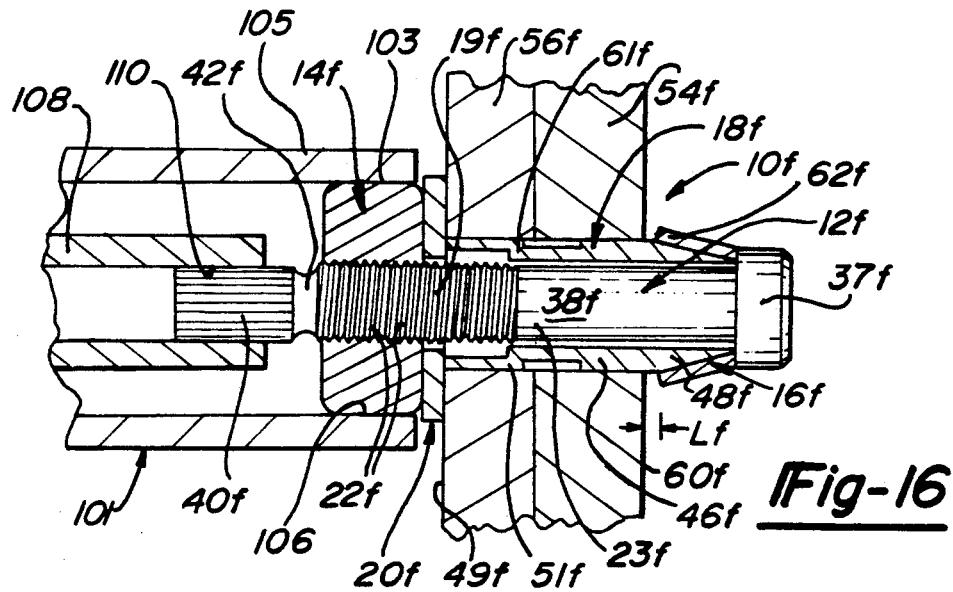
FIG. 16 is a view similar to FIG. 15 showing the blind fastener after the expandable sleeve has been axially moved over the tapered nose portion and has been radially expanded to define a blind head.
Figure 17:
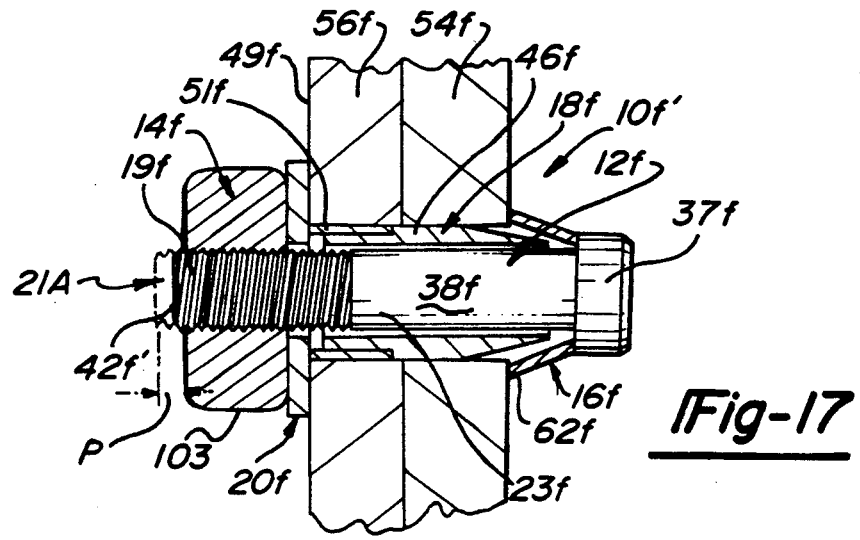
FIG. 17 is a view similar to FIGS. 15 and 16 showing the fastener after it has been finally set.
Figure 18:
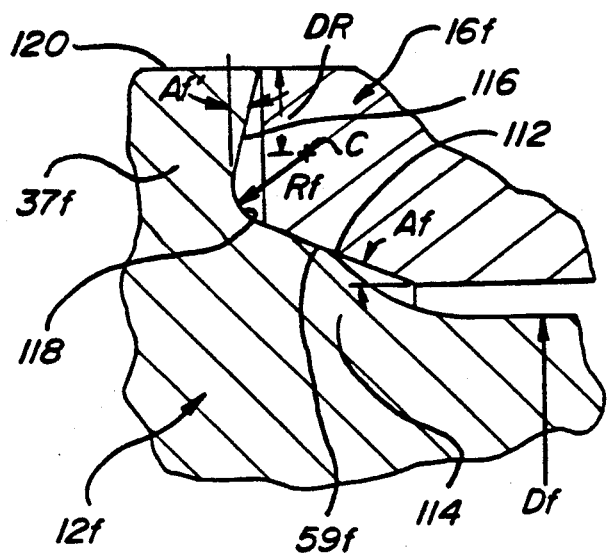
FIG. 18 is a fragmentary, sectional view to enlarged scale taken generally in the area of the circle 18A in FIG. 15.
Figure 19:
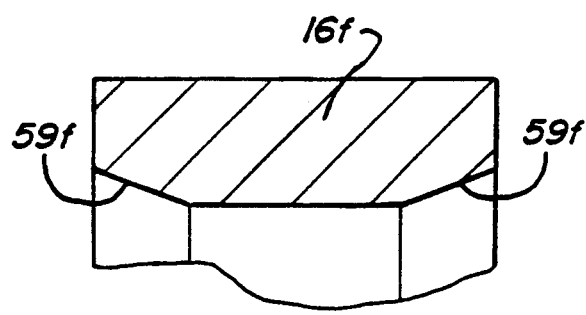
FIG. 19 is a fragmentary, sectional longitudinal view to enlarged scale of the primary or expandable sleeve of the embodiment of FIGS. 15-17.
Figure 20:
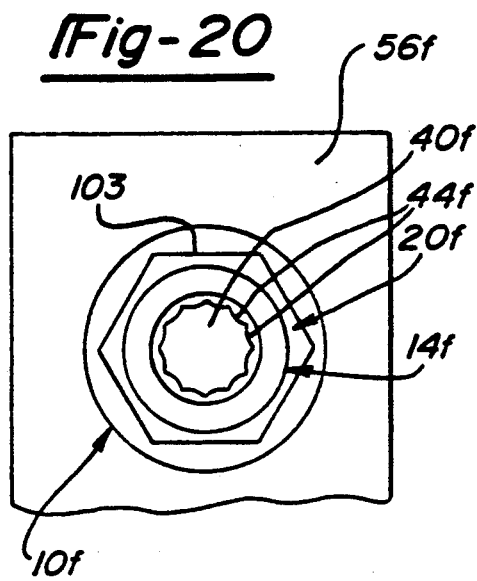
FIG. 20 is an end view of the fastener of FIG. 15 taken generally in the direction of the arrow 20A in FIG. 15.

Looking now to FIGS. 15–17, a blind fastener 10f includes a central, core bolt or pin 12f, a threaded nut 14f, a primary or expandable sleeve 16f, a secondary or main sleeve 18f and a hold-off washer 20f.

The pin 12f has an enlarged head 37f at one end of pin shank 23f. The pin shank 23f has a relatively smooth portion 38f leading to a threaded shank portion 19f; a reduced diameter splined, pintail portion 40f is formed with a plurality of circumferentially disposed, axially extending splines 44f (see FIG. 20) and is connected to the threaded portion 19f via an annular breakneck groove 42f. The breakneck groove 42f is of a reduced cross-sectional area which is designed to fracture at a predetermined torsional load. As can be seen in FIG. 15, the nut 14f is adapted to be threadably engaged with the threaded shank portion 19f.

The expandable, primary sleeve 16f and the secondary or main sleeve 18f are generally identical with primary sleeve 16 and main sleeve 18 of FIGS. 1–5 and hence the specific details thereof shall not be repeated here.

In contrast to the pull and swage type fastener 10 of FIGS. 1–5, the threaded or torque type fastener 10f is adapted to be set by torque applied between the pin 12f and nut 14f via the threaded engagement of nut 14f on the threaded shank portion 19f. The installation can be accomplished by a tool 101 of a construction generally known in the art and hence only a portion of the tool 101 is shown and the details thereof have been omitted for purposes of simplicity. The nut 14f has a conventional hexagonal outer surface 103 which is adapted to be drivingly engaged by a tubular socket like outer wrench member 105 having a hexagonally shaped inner surface 106 at its outer end configured to matingly receive the hexagonal outer nut surface 103. The tool 101 has a central socket member 108 which has an inner surface 110 at its outer end which is splined to matingly receive the splined pintail portion 40f of the pin member 12f. In one form of tool 101, the central member 108 is resiliently axially biased forwardly to provide sufficient engagement with the splined pintail portion 40f as shown in FIG. 15 to accept the initial torque loads. The outer wrench member 105 and central member 108 are adapted to be rotated relative to each other. Thus to install the fastener 10f the tool 101 is applied to the outer end of the fastener 10f with the wrench member 105 in engagement with the hexagonal nut surface 103 and with the central member 108 in engagement with the splined pintail portion 40f. When the tool 101 is actuated the wrench member 105 is rotated relative to the central member 108 whereby the nut 14f is threaded onto the threaded shank portion 19f. Note that as this occurs the pin member 12f moves axially relative to the nut 14f until there is full engagement between splined portion 40f and inner socket surface 110. After such full engagement the resilient bias on the central member 108 permits it to be moved axially rearwardly to thus accommodate the additional axial movement of the pin member 12f relative to the tool 101.

Thus in this way a relative axial force is developed between the pin member 12f and the secondary sleeve 18f and expandable sleeve 16f by virtue of the torque applied by the tool 101 between the pin 12f and nut 14f.

The free end 58f of expandable sleeve 16f engages the tapered nose portion 48f on secondary sleeve 18f. The inside diameter of sleeve 16f has a chamfer 59f at free end 58f at an angle substantially the same as that of nose portion 48f (see FIG. 19). Chamfer 59f is provided at both ends of the sleeve 16f whereby either end can serve as the free end 58f thereby simplifying assembly. Thus as expandable sleeve 16f is moved axially it overengages the surface of the tapered nose portion 48f and is radially expanded. At the same time, as the pin 12f begins to move axially via the relative rotation with the nut 14f, the relative axial force is thus applied and the expandable sleeve 16f will be moved axially relative to the secondary sleeve 18f over the tapered nose portion 48f until the pin head 37f engages the nose portion 48f. In this position the expandable sleeve 16f will have been radially expanded to fully define the blind head 62f, at a point spaced from the blind side surface 60f. This is shown in FIG. 16. As the relative axial force increases the frangible rib 61f fractures permitting the nose portion 48f to move generally freely axially relative to the frangible portion 51f of the sleeve 18f. The axial width Wf of groove 53f is selected to be greater than the distance Lf from the free end 58f of expandable sleeve 16f to the blind side surface 60f of workpiece 54f after the blind head 62f is fully formed as shown in FIG. 16. In a minimum grip condition, i.e. workpieces 54f and 56f of minimum total thickness, the width Wf should be at least slightly greater than the distance Lf to assure that the fractured nose portion 48f is removed from load bearing engagement with the expanded sleeve 16f. Thus the blind head 62f is moved into engagement with the blind side surface 60f of workpiece 54f as shown in FIG. 17. As noted, with the fractured nose portion 48f out of load bearing engagement, the resultant relative axial load resulting from the torque between the nut 14f and pin 12f is applied substantially solely between the nut 14f and the pin 12f via the pin head 37f and the blind head 62f.

Figure 21:
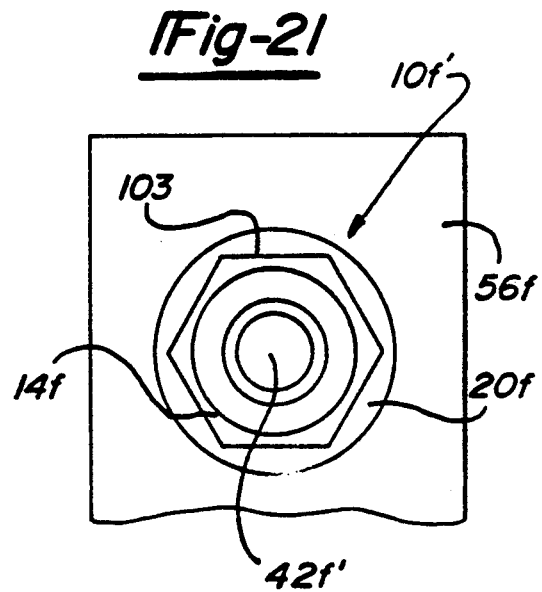
FIG. 21 is an end view of the set fastener of FIG. 17 taken generally in the direction of the arrow 21A in FIG. 17.

In this condition the applied torque and resultant axial load is increased until fracture of the breakneck groove 42f whereby the pintail portion 40f is severed and the installation is completed as shown in FIG. 17. The remaining fractured portion 42f' of breakneck groove 42f is indicated in FIGS. 17 and 21. Thus the final clamp load attained and applied by the set fastener 10f' of FIG. 17 will not be affected by the fractured nose portion 48f.

The torque applied fastener 10f will have the same minimum blind side clearance Bf in its preset condition (FIG. 15) and the same minimum blind side clearance in its set condition (FIG. 17) as the pull type fastener 10 of FIGS. 1–5. In order to minimize the length of the pintail portion 40f and the protruding length P of the threaded pin shank portion 19f after installation, the lengths of both the pintail portion 40f and of the threaded pin shank portion 19f have been minimized. In order to start formation of the blind head 62f by expanding the expandable sleeve 16f, threaded engagement between all of the threads of the nut 14f and threads of the threaded pin shank portion 19f is not required. Thus the number of threads initially engaged is selected to be around 25% greater than that required to withstand the applied torque to start the formation of the blind head 62f without thread damage. It is believed preferable that at least three full threads be initially engaged. Similarly full engagement of the splined inner surface 110 of central socket member 108 with the splined pintail portion 40f is not initially necessary. As can be seen in FIG. 16, with the blind head 62f fully formed there is now greater engagement of the threads of the nut 14f with the threads of the threaded pin shank portion 19f. At the same time there is also greater engagement of the splined inner surface 110 and the splined pintail portion 40f. In this way the overall length of the fastener 10f can be limited and perhaps more importantly the extent of final pin protrusion P can be limited over the grip range of the fastener 10f. In this regard the final pin protrusion P in the maximum grip condition, by the proper selection of the amount of required thread engagement at different stages of installation, can be substantially zero or set to be no greater than the minimum blind side clearance Lf (see FIG. 16).

As previously noted with the pull type fastener 10 of FIGS. 1–5, a principal objective of the present invention is to provide a blind fastener having very high strength characteristics not present in other blind fasteners whereby such blind fastener can be used in applications in which conventional high strength bolts have been used. In addition to providing a blind head 62f which geometrically has a high resistance to column buckling, the materials of the fastener 10f are selected to be of high strength and hence high hardness and are generally the same as that described for the fastener 10. In addition, however, the nut 14f can be made of a high strength material such as a 4130 alloy steel of aircraft quality having a Rockwell hardness of between around 28Rc to around 32Rc or of the same Rockwell hardness as pin member 12f, i.e. between around 38Rc to around 42Rc.

It should be noted that the number of threads of nut 14f engaged with the threaded pin shank portion 19f in full, final engagement is selected to be sufficient to provide the desired high level of clamp up of the workpieces 54f and 56f and to resist the maximum design tensile load on the resultant joint. Thus the nut height or width H of nut 14f is selected to be sufficient to provide the necessary number of threads to withstand these loads on full engagement. At the same time the length of the threaded pin shank portion 19f is selected to provide full thread engagement with the threads of nut 14f over the entire grip range of the fastener 10f while providing the minimum protruding length P. In this way the overall length of the fastener 10f can be minimized in both the installed and uninstalled conditions.

As noted with fastener 10 of FIGS. 1–5, by being able to utilize an expandable sleeve 16f of a minimum length, excessive flaring of the free end 58f is avoided; this factor plus the shorter overall length provides excellent resistance to buckling under column loading. As with the pull type fastener 10, with fastener 10f a dry film lubricant such as molydisulphide can be used to reduce friction between the moving parts. A molydisulphide such as Ecoa Lub 642 by Everlube is believed to be satisfactory.

It is important that the axis of expandable sleeve 16f be maintained in coaxial alignment with the axis of the pin 12f during the installation cycle including formation of the blind head 62f and its engagement with the blind side surface 60f. In order to avoid high frictional forces caused by engagement between the nose portion 48f and the smooth pin shank portion 38f as the sleeve 16f is radially expanded, the inside diameter of the nose portion 48f and sleeve 16f are provided to have a preselected desired radial clearance with the confronting surface of the pin shank portion 38f. Note, however, that when the frangible rib 61f fractures the severed nose portion 48f is free to move axially away from the sleeve 16f which has now been expanded. As a result of the radial clearance, the sleeve 16f could, in some applications, move or shift radially relative to the pin shank portion 38f and hence shift radially relative to the axis of the pin 12f such that the axis of the sleeve 16f is no longer in coaxial alignment with the axis cf the pin 12f; this could place the sleeve 16f in a position eccentric to the workpiece opening 50f. In this condition one side of the sleeve 16f could initially move partially into the workpiece opening 50f whereby the bearing engagement would be irregular circumferentially causing an off-center or circumferentially irregular engagement with the underside of the pin head 37f. This could result in loss of strength and/or premature failure of the installed fastener. To maintain the desired concentricity and to avoid tilting or loss of coaxial alignment a tapered surface 112 of enlarged and increasing diameter is provided on the pin shank portion 114 immediately adjacent to and connected with the underside surface 116 of the pin head 37f (see FIG. 18). The tapered surface 112 on the pin shank portion 114 is provided with the same angle of taper as the tapered end 59f of expandable sleeve 16f. Now when the expandable sleeve 16f is located on the pin shank 23f the mating tapered surfaces 59f and 112 will guide the associated end of sleeve 16f towards the pin head 37f and ad in capturing and holding it in the desired coaxial position whereby a uniform, concentric engagement with the underside surface 116 will be assured; this in turn will assure the proper formation of the blind head 62f and uniform engagement with the blind side surface 60f around the workpiece opening 50f. The pin shank portion 114 is smoothly connected to the pin head underside surface 116 by a radiused fillet 118. The radius Rf of fillet 118 is selected to minimize any stress concentration at that point. However, the stresses at the fillet 118 are generally reduced, in any event, because it is radially closer to the outer end of the pin head 37f by virtue of the connecting shank portion 114. In one form cf the fastener 10f the tapered surfaces 59f and 112 were inclined at an angle Af of 20° relative to the longitudinal axis of the pin 12f. Also the radius Rf of fillet 118 for a pin 12f having a shank diameter Df of 0.609 inches was 0.03 inches and had the center C of radius Rf located generally a distance DR of 0.089 inches from the radially outer surface 120 of pin head 37f (see FIGS. 15 and 18).

The underside surface 116 of pin head 37f is inclined from fillet 118 radially outwardly and axially forwardly relative to a plane transverse to the longitudinal axis of the pin 12f generally at an angle Af of 15°. This is to ensure that the associated engaging end of the expandable sleeve 16f would not engage the fillet 118 but rather would engage the underside surface 116 at a point radially outwardly from the fillet 118. The construction of the underside surface 116 including angle Af is selected to cooperate and to assist in capturing and holding the sleeve 16f in the desired coaxial position as discussed above.

It should be noted that the above described construction for capturing and holding the sleeve 16f in the desired coaxial position could be employed with the pull type fastener 10 of FIGS. 1–4.

In addition to the reduction of the stress concentrations, as noted, the threads 22f of the threaded shank portion 19f are formed to be generally shallow in depth and to have roots of a generally streamlined contour. Thus, in one embodiment, the threads 22f could utilize the groove shape and concepts of '852 Dixon patent previously noted. With this root construction, the stress concentration at the threads 22f is also reduced.

As noted in the '852 Dixon patent, the threads 22f can be of a shallow helical construction with a generally streamlined shape whereby a high strength joint construction can be achieved having a desirable high clamp load. With the noted shallow thread structure, a close tolerance fit with the threads of the nut 14f is desirable. In one form of the invention a Class 3 thread fit was utilized. Thus with a major diameter of 0.500 inches on the threads 22f of the pin shank portion 19f, a minor diameter of 0.495 inches was used on the mating threads of the nut 14f.

As noted it is desirable that the high strength fastener of the present invention provide a high final clamp load to the fastened joint. To achieve this result high installation loads including final pin break load at breakneck groove 42f are required from the installation tool 101. These loads, however, are applied by torque and hence are generally absorbed by the tool 101 and are essentially not transmitted to the operator handling the installation tool 101. Thus the high load occurring at pin break at breakneck groove 42f is substantially absorbed by the tool 101 by virtue of the torque application of the fastener 10f.

As with the fastener 10 of the embodiment of FIGS. 1 and 2, a main sleeve (such as 18f) of a multiple pieced construction could be used advantageously with the fastener 10f such as sleeve 18e with sections 73 and 75 as shown in FIG. 6.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, a tubular collar structure operatively associated with said main sleeve structure and located on said pin shank at the accessible surface side of the workpieces and adapted to be swaged into said lock grooves in response to the relative axial force of a first magnitude applied by the installation tool between said pin and said collar structure, said tapered nose portion defining a preselected angle with said central axis, said expandable sleeve moving axially relative to and expanding radially over said nose portion in response to the relative axial force of a second magnitude less than said first magnitude to form an enlarged blind head for reacting against the blind side surface, said sleeve shank portion of said main sleeve structure terminating at its end opposite from said tapered nose portion in an enlarged counterbored portion, a grooved portion having an annular groove formed on the outer surface of said sleeve shank portion adjacent to said enlarged counterbored portion and adapted to move axially within said counterbored portion, a frangible portion connecting said enlarged counterbored portion with said annular grooved portion, said frangible portion adapted to fracture at a third magnitude of relative axial force less than said first magnitude and greater than said second magnitude with said grooved portion moving axially into said enlarged counterbored portion thereby moving said main sleeve structure out of axial load bearing engagement with said blind head, whereby the final clamp load applied to the workpieces will be substantially unaffected by said main sleeve structure.

2. The blind bolt of claim 1 with said expandable sleeve member having a length within a range of from generally equal to slightly greater than the length of said tapered nose portion.

3. The blind bolt of claim 1 with said expandable sleeve member having a length greater than the length of said tapered nose portion by around the wall thickness of said expandable sleeve member.

4. The blind bolt of claim 1 with said annular groove and said enlarged counterbored portion having axial lengths selected to define the grip range of the fastener, where the grip range is defined as the difference between the minimum and maximum total thickness of the workpieces that a single fastener can secure together.

5. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, a tubular collar structure operatively associated with said main sleeve structure and located on said pin shank at the accessible surface side of the workpieces and adapted to be swaged into said lock grooves in response to the relative axial force of a first magnitude applied by the installation tool between said pin and said collar structure, said tapered nose portion defining a preselected angle with said central axis, said expandable sleeve moving axially relative to and expanding radially over said nose portion in response to the relative axial force of a second magnitude less than said first magnitude to form an enlarged blind head for reacting against the blind side surface, said sleeve shank portion of said main sleeve structure terminating at its end opposite from said tapered nose portion in an enlarged counterbored portion, a grooved portion having an annular groove formed on the outer surface of said sleeve shank portion adjacent to said enlarged counterbored portion and adapted to move axially within said counterbored portion, a frangible portion connecting said enlarged counterbored portion with said annular grooved portion, said frangible portion adapted to fracture at a third magnitude of relative axial force less than said first magnitude and greater than said second magnitude with said grooved portion moving axially into said enlarged counterbored portion thereby moving said main sleeve structure out of axial load bearing engagement with said blind head, whereby the final clamp load applied to the workpieces will be substantially unaffected by said main sleeve structure, said expandable sleeve member having a length within a range of from generally equal to slightly greater than the length of said tapered nose portion, said annular groove and said enlarged counterbored portion having axial lengths selected to define the grip range of the fastener, where the grip range is defined as the difference between the minimum and maximum total thickness of the workpieces that a single fastener can secure together.

6. A blind bolt for securing a plurality of workpieces at a desired clap load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves a nd a pull portion comprising a plurality of pull grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force of a first magnitude applied by the installation tool between said pin and said collar, said tapered nose portion defining a preselected angle with said central axis, said expandable sleeve moving axially relative to and expanding radially over said nose portion in response to the relative axial force of a second magnitude less than said first magnitude to form an enlarged blind head for reacting against the blind side surface, said sleeve shank portion of said main sleeve structure terminating at its end opposite from said tapered nose portion in an enlarged counterbored portion, a grooved portion having an annular groove formed on the outer surface of said sleeve shank portion adjacent to said enlarged counterbored portion and adapted to move axially within said counterbored portion, a frangible portion connecting said enlarged counterbored portion with said annular grooved portion, said frangible portion adapted to fracture at a third magnitude of relative axial force less than said first magnitude and greater than said second magnitude with said grooved portion moving axially into said enlarged counterbored portion thereby moving said main sleeve structure out of axial load bearing engagement with said blind head, whereby the final clamp load applied to the workpieces will be substantially unaffected by said main sleeve structure, an enlarged hold-off washer located between said collar and the outer end of said main sleeve member and adapted to engage the accessible surface of the workpieces, said expandable sleeve member having a Rockwell hardness of between around 28Rc to around 32Rc, said pin member having a Rockwell hardness of between around 38Rc to around 42Rc, said collar having a Rockwell hardness of between around 68Rb to around 78Rb, said expandable sleeve member being constructed of a quality steel having a nickel content greater than around 0.17% by weight, said hold-off washer having a Rockwell hardness of between around 40Rc to around 45Rc, whereby a high strength blind bolt is formed.

7. The high strength blind bolt of claim 6 with said main sleeve structure having a Rockwell hardness of between around 43Rc to around 47Rc.

8. The high strength blind bolt of claim 6 with said expandable sleeve member having a length within a range of from generally equal to slightly greater than the length of said tapered nose portion.

9. The high strength blind bolt of claim 6 with said expandable sleeve member having a length greater than the length of said tapered nose portion by around the wall thickness of said expandable sleeve member.

10. The high strength blind bolt of claim 6 with said annular groove and said enlarged counterbored portion having axial lengths selected to define the grip range of the fastener, where the grip range is defined as the difference between the minimum and maximum total thickness of the workpieces that a single fastener can secure together.

11. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force of a first magnitude applied by the installation tool between said pin and said collar, said tapered nose portion defining a preselected angle with said central axis, said expandable sleeve moving axially relative to and expanding radially over said nose portion in response to the relative axial force of a second magnitude less than said first magnitude to form an enlarged blind head for reacting against the blind side surface, said sleeve shank portion of said main sleeve structure terminating at its end opposite from said tapered nose portion is an enlarged counterbored portion, a groove portion having an annular groove formed on the outer surface of said sleeve shank portion adjacent to said enlarged counterbored portion and adapted to move axially within said counterbored portion, a frangible portion connecting said enlarged counterbored portion with said annular grooved portion, said frangible portion adapted to fracture at a third magnitude of relative axial force less than said first magnitude and greater than said second magnitude with said grooved portion moving axially into said enlarged counterbored portion thereby moving said main sleeve structure out of axial load bearing engagement with said blind head, whereby the final clamp load applied to the workpieces will be substantially unaffected by said main sleeve structure, said enlarged counterbored portion and said grooved portion being on a member separated from said tapered nose portion.

12. The blind bolt of claim 11 with said expandable sleeve member having a length within a range of from generally equal to slightly greater than the axial length of said tapered nose portion.

13. The blind bolt of claim 11 with said expandable sleeve member having a length greater than the length of said tapered nose portion by around the wall thickness of said expandable sleeve member.

14. The blind bolt of claim 11 with said annular groove and said enlarged counterbored portion having axial lengths selected to define the grip range of the fastener, where the grip range is defined as the difference between the minimum and maximum total thickness of the workpieces that a single fastener can secure together.

15. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force of a first magnitude applied by the installation tool between said pin and said collar, said tapered nose portion defining a preselected angle with said central axis, said expandable sleeve moving axially relative to and expanding radially over said nose portion in response to the relative axial force of a second magnitude less than said first magnitude to form an enlarged blind head for reacting against the blind side surface, said sleeve shank portion of said main sleeve structure terminating at its end opposite from said tapered nose portion in an enlarged counterbored portion, a grooved portion having an annular groove formed on the outer surface of said sleeve shank portion adjacent to said enlarged counterbored portion and adapted to move axially within said counterbored portion, a frangible portion connecting said enlarged counterbored portion with said annular grooved portion, said frangible portion adapted to fracture at a third magnitude of relative axial force less than said first magnitude and greater than said second magnitude with said grooved portion moving axially into said enlarged counterbored portion thereby moving said main sleeve structure out of axial load bearing engagement with said blind head, whereby the final clamp load applied to the workpieces will be substantially unaffected by said main sleeve structure, said enlarged counterbored portion and said groove portion being on a member separate from said tapered nose portion, said expandable sleeve member having an axial length generally equal to the axial length of said tapered nose portion, said annular groove and said enlarged counterbored portion having axial lengths selected to define the grip range of the fastener, where the grip range is defined as the difference between the minimum and maximum total thickness of the workpieces that a single fastener can secure together.

16. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure comprising a frangible section and a separate sleeve shank section, said sleeve shank section terminating at one end in a tapered nose portion, said sleeve shank section and said frangible section adapted to be located in the aligned openings in the workpieces with said tapered nose portion located outwardly of the blind side surface, said main sleeve structure defining a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force of a first magnitude applied by the installation tool between said pin and said collar, said tapered nose portion defining a preselected angle with said central axis, said expandable sleeve moving axially relative to and expanding radially over said nose portion in response to the relative axial force of a second magnitude less than said first magnitude to form an enlarged blind head for reacting against the blind side surface, said frangible section having a radially stepped construction and terminating at its end opposite from said tapered nose portion in an enlarged counterbored portion, a grooved portion having an annular groove formed on the outer surface of said frangible section adjacent to said enlarged counterbored portion and adapted to move axially within said counterbored portion, a frangible portion connecting said enlarged counterbored portion with said annular grooved portion, said frangible portion adapted to fracture at a third magnitude of relative axial force less than said first magnitude and greater than said second magnitude with said grooved portion moving axially into said enlarged counterbored portion thereby moving said tapered nose portion and hence said main sleeve structure out of axial load bearing engagement with said blind head, whereby the final clamp load applied to the workpieces will be substantially unaffected by said main sleeve structure, an enlarged hold-off washer located between said collar and the outer end of said main sleeve member and adapted to engage the accessible surface of the workpieces, said expandable sleeve member having a Rockwell hardness of between around 28Rc to around 32Rc, said pin member having a Rockwell hardness of between around 38Rc to around 42Rc, said collar having a Rockwell hardness of between around 68Rb to around 78Rb, said expandable sleeve member being constructed of a quality steel having a nickel content greater than around 0.17% by weight, said hold-off washer having a Rockwell hardness of between around 40Rc to around 45Rc, whereby a high strength blind bolt is formed.

17. The high strength blind bolt of claim 16 with said main sleeve structure having a Rockwell hardness of between around 43Rc to around 47Rc.

18. The high strength blind bolt of claim 16 with said expandable sleeve member having a length within a range of from generally equal to slightly greater than the axial length of said tapered nose portion.

19. The high strength blind bolt of claim 16 with said expandable sleeve member having a length greater than the length of said tapered nose portion by around the wall thickness of said expandable sleeve member.

20. The high strength blind bolt of claim 16 with said annular groove and said enlarged counterbored portion having axial lengths selected to define the grip range of the fastener, where the grip range is defined as the difference between the minimum and maximum total thickness of the workpieces that a single fastener can secure together.

21. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force of a first magnitude applied by the installation tool between said pin and said collar, said tapered nose portion defining a preselected angle with said central axis, said expandable sleeve moving axially relative to and expanding radially over said nose portion in response to the relative axial force of a second magnitude less than said first magnitude to form an enlarged blind head for reacting against the blind side surface, said main sleeve structure being operable for initially transmitting the relative axial force between said pin member and said expandable sleeve to form said blind head and having a deformable portion responsive to the relative axial force of a third magnitude greater than said second magnitude and less than said first magnitude to deform to a position substantially out of load bearing relationship with said blind head to thereby prevent transmission of the relative axial force through said main sleeve structure whereby the final clamp load applied to the workpieces will be substantially unaffected by said main sleeve structure.

22. The blind bolt of claim 21 with said deformable portion of said main sleeve structure including a frangible section adapted to fracture at said third magnitude of relative axial force.

23. The blind bolt of claim 21 with said deformable portion of said main sleeve structure including a radially stepped structure defined by two sleeve portions connected by a frangible section with said frangible section adapted to fracture at said third magnitude of relative axial force to permit said stepped structure to axially move within itself.

24. The blind bolt of claim 21 with said deformable portion being a member separate from said nose portion.

25. The blind bolt of claim 21 with said expandable sleeve member having a length slightly greater than the length of said tapered nose portion.

26. The blind bolt of claim 21 with said expandable sleeve member having a length within a range of from generally equal to slightly greater than the length of said tapered nose portion by around the wall thickness of said expandable sleeve member.

27. The blind bolt of claim 21 with said expandable sleeve member having a Rockwell hardness of between around 28Rc to around 32Rc, said pin member having a Rockwell hardness of between around 38Rc to around 42TRc, whereby a high strength blind bolt is formed.

28. The high strength blind bolt of claim 27 with said collar having a Rockwell hardness of between around 68Rb to around 78Rb.

29. The high strength blind bolt of claim 28 with said main sleeve structure having a Rockwell hardness of between around 43Rc to around 47Rc.

30. The high strength blind bolt of claim 27 with said expandable sleeve member being constructed of a quality steel having a nickel content greater than around 0.17% by weight.

31. The high strength blind bolt of claim 27 with said expandable sleeve member being constructed of a quality 4130 steel having a nickel content greater than around 0.17% by weight.

32. The high strength blind bolt of claim 27 further comprising an enlarged hold-off washer located between said collar and the outer end of said main sleeve structure and adapted to engage the accessible surface of the workpieces, said hold-off washer having a Rockwell hardness of between around 40Rc to around 45Rc.

33. The blind bolt of claim 22 with said pin shank having a breakneck groove located between said lock grooves and said pull grooves and adapted to fracture at a preselected magnitude of relative axial force after said collar has been fully swaged in said lock grooves, the root diameter of said breakneck groove relative to that of said pull grooves being in the ratio of around 0.82:1 to inhibit fracture at one of said pull grooves at a magnitude of relative axial force less than that of said breakneck groove.

34. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force of a first magnitude applied by the installation tool between said pin and said collar, said tapered nose portion defining a preselected angle with said central axis, said expandable sleeve moving axially relative to and expanding radially over said nose portion in response to the relative axial force of a second magnitude less than said first magnitude to form an enlarged blind head for reacting against the blind side surface, said main sleeve structure being operable for initially transmitting the relative axial force between said pin member and said expandable sleeve to form said blind head and having a deformable portion responsive to the relative axial force of a third magnitude greater than said second magnitude and less than said first magnitude to deform to a position substantially out of load bearing relationship with said blind head to thereby prevent transmission of the relative axial force through said main sleeve structure whereby the final clamp load applied to the workpieces will be substantially unaffected by said main sleeve structure, an enlarged hold-off washer located between said collar and the outer end of said main sleeve member and adapted to engage the accessible surface of the workpieces, said expandable sleeve member having a Rockwell hardness of between around 28Rc to around 32Rc, said pin member having a Rockwell hardness of between around 38Rc to around 42Rc, said collar having a Rockwell hardness of between around 68Rb to around 78Rb, said expandable sleeve member being constructed of a quality steel having a nickel content greater than around 0.17% by weight, said hold-off washer having a Rockwell hardness of between around 40Rc to around 45Rc, whereby a high strength blind bolt is formed.

35. The high strength blind bolt of claim 34 with said main sleeve structure having a Rockwell hardness of between around 43Rc to around 47Rc.

36. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force of a first magnitude applied by the installation tool between said pin and said collar, said tapered nose portion defining a preselected angle with said central axis, said expandable sleeve moving axially relative to and expanding radially over said nose portion in response to the relative axial force of a second magnitude less than said first magnitude to form an enlarged blind head for reacting against the blind side surface, said main sleeve structure being operable for initially transmitting the relative axial force between said pin member and said expandable sleeve to form said blind head and having a deformable portion responsive to the relative axial force of a third magnitude greater than said second magnitude and less than said first magnitude to deform to a position substantially out of load bearing relationship with said blind head to thereby prevent transmission of the relative axial force through said main sleeve structure whereby the final clamp load applied to the workpieces will be substantially unaffected by said main sleeve structure, said pin shank having a generally smooth portion extending generally from said pin head to said lock grooves, said pin head connected to said smooth shank by a streamlined fillet generally defined by a first radius which is generally tangent to said smooth shank and a second radius which is generally tangent to the inner surface of said pin head, said first radius being around twice the magnitude of said second radius.

37. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force of a first magnitude applied by the installation tool between said pin and said collar, said tapered nose portion defining a preselected angle with said central axis, said expandable sleeve moving axially relative to and expanding radially over said nose portion in response to the relative axial force of a second magnitude less than said first magnitude to form an enlarged blind head for reacting against the blind side surface, said main sleeve structure being operable for initially transmitting the relative axial force between said pin member and said expandable sleeve to form said blind head and having a deformable portion responsive to the relative axial force of a third magnitude greater than said second magnitude and less than said first magnitude to deform to a position substantially out of load bearing relationship with said blind head to thereby prevent transmission of the relative axial force through said main sleeve structure whereby the final clamp load applied to the workpieces will be substantially unaffected by said main sleeve structure, said workpiece including a box beam and a structure to be secured to at least two adjacent, transverse sides of said box beam, said adjacent transverse sides defining a corner, said sets of aligned openings having axes in a common plane with at least two of said sets of aligned openings being in each adjacent transverse side at said corner, one of said fastener located in each of said sets of aligned openings at said corner with an installed one of said fasteners providing clearance within said box beam with a preinstalled one of said fasteners at said corner.

38. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force of a first magnitude applied by the installation tool between said pin and said collar, said tapered nose portion defining a preselected angle with said central axis, said expandable sleeve moving axially relative to and expanding radially over said nose portion in response to the relative axial force of a second magnitude less than said first magnitude to form an enlarged blind head for reacting against the blind side surface, said main sleeve structure being operable for initially transmitting the relative axial force between said pin member and said expandable sleeve to form said blind head and having a deformable portion responsive to the relative axial force of a third magnitude greater than said second magnitude and less than said first magnitude to deform to a position substantially out of load bearing relationship with said blind head to thereby prevent transmission of the relative axial force through said main sleeve structure whereby the final clamp load applied to the workpieces will be substantially unaffected by said main sleeve structure, said workpieces including at least a pair of plate like members with one of said members generally located in engagement with a relatively solid substrate, said aligned openings in said pair of members being in line with a blind cavity in said substrate with said blind cavity being formed while said substrate is adjacent said one of said members, said fastener in the preset condition having the blind side protrusion of said pin head and said expandable sleeve selected to be a minimum with the clearance of said pin head with said cavity being a minimum.

39. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces and with the desired clamp load being between around 70% to around 80% of the minimum ultimate tensile strength of the installed blind bolt, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, a collar located on said pin shank at the accessible surface side of the workpieces and adapted to be swaged into said lock grooves in response to the relative axial force of a first magnitude applied by the installation tool between said pin and said collar, said tapered nose portion defining a preselected angle with said central axis, said expandable sleeve moving axially, relative to and expanding radially over said nose portion in response to the relative axial force of a second magnitude less than said first magnitude to form an enlarged blind head for reacting against the blind side surface, said sleeve shank portion of said main sleeve structure terminating at its end opposite from said tapered nose portion in an enlarged counterbored portion, a grooved portion having an annular groove formed on the outer surface of said sleeve shank portion adjacent to said enlarged counterbored portion and adapted to move axially within said counterbored portion, a frangible portion connecting said enlarged counterbored portion with said annular grooved portion, said frangible portion adapted to fracture at a third magnitude of relative axial force less than said first magnitude and greater than said second magnitude with said grooved portion moving axially into said enlarged counterbored portion thereby moving said main sleeve structure out of axial load bearing engagement with said blind head, whereby the final clamp load applied to the workpieces will be substantially unaffected by said main sleeve structure, an enlarged hold-off washer located between said collar and the outer end of said main sleeve member and adapted to engage the accessible surface of the workpieces, said expandable sleeve member having a Rockwell hardness of between around 28Rc to around 32Rc, said pin member having a Rockwell hardness of between around 38Rc to around 42Rc, said collar having a Rockwell hardness of between around 68Rb to around 78Rb, said expandable sleeve member being constructed of a quality steel having a nickel content greater than around 0.17% by weight, said hold-off washer having a Rockwell hardness of between around 40Rc to around 45Rc, whereby a high strength blind bolt is formed, said main sleeve structure having a Rockwell hardness of between around 43Rc to around 47Rc.

40. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion and a pull portion comprising a plurality of pull grooves, sleeve means including a main sleeve structure having an elongated sleeve shank portion, said sleeve shank portion adapted to be located in the aligned openings in the workpieces, said main sleeve structure adapted to receive said pin shank, said sleeve means further comprising an expandable sleeve structure adapted to receive said pin shank and being located on said pin shank between said pin head and said main sleeve structure, lock means operatively connected with said sleeve means and including a lock structure adapted to be moved into said lock portion in response to the relative axial force of a first magnitude applied by the installation tool, said expandable sleeve structure being radially deformable in response to the relative axial force of a second magnitude less than said first magnitude to form an enlarged blind head for reacting against the blind side surface, said sleeve means including a collapsible structure adapted to collapse at a third magnitude of relative axial force less than said first magnitude and greater than said second magnitude with said main sleeve structure movable out of an axial load bearing connection whereby said blind head will engage the blind side surface such that the final clamp load applied to the workpieces will be substantially between said pin member, said blind head and said lock means.

41. The blind bolt of claim 40 with said main sleeve structure and said expandable sleeve structure being separate members, said main sleeve structure having an elongated sleeve shank portion terminating at its inner end in a tapered nose portion, said sleeve shank portion adapted to be located in the aligned openings in the workpieces, said main sleeve structure having a first through bore adapted to receive said pin shank with said first bore having a central axis, said expandable sleeve structure having a second through bore adapted to receive said pin shank and being located on said pin shank between said pin head and said tapered nose portion, said tapered nose portion defining a preselected angle with said central axis, said expandable sleeve moving axially relative to and expanding radially over said nose portion in response to the relative axial force of said second magnitude to form an enlarged blind head for reacting against the blind side surface.

42. The blind bolt of claim 41 with said main sleeve structure being formed with said collapsible structure.

43. The blind bolt of claim 40 with said expandable sleeve structure having a weakened portion adapted to fold radially outwardly to form said blind head in a bulb form in response to the relative axial force of said second magnitude.

44. The blind bolt of claim 40 with said main sleeve structure and said expandable sleeve structure being separate members, said main sleeve structure having an elongated sleeve shank portion adapted to be located in the aligned openings in the workpieces, said main sleeve structure having a first through bore adapted to receive said pin shank, said expandable sleeve structure having a second through bore adapted to receive said pin shank and being located on said pin shank adjacent said pin head, said expandable sleeve structure having a weakened portion adapted to fold radially outwardly to form said blind head in a bulb form in response to the relative axial force of said second magnitude.

45. The blind bolt of claim 44 with said main sleeve structure being formed with said collapsible structure.

46. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, sleeve means including a main sleeve structure having an elongated sleeve shank portion, said sleeve shank portion adapted to be located in the aligned openings in the workpieces, said main sleeve structure adapted to receive said pin shank, said sleeve means further comprising an expandable sleeve structure adapted to receive said pin shank and being located on said pin shank between said pin head and said main sleeve structure, collar means operatively connected with said sleeve means and including a collar structure located on said pin shank at the accessible surface side of the workpieces and adapted to be swaged into said lock grooves in response to the relative axial force of a first magnitude applied by the installation tool between said pin and said collar structure, said expandable sleeve structure being radially deformable in response to the relative axial force of a second magnitude less than said first magnitude to form an enlarged blind head for reacting against the blind side surface, said sleeve means including a collapsible structure adapted to collapse at a third magnitude of relative axial force less than said first magnitude and greater than said second magnitude with said main sleeve structure movable out of an axial load bearing connection whereby said blind head will engage the blind side surface such that the final clamp load applied to the workpieces will be substantially between said pin member, said blind head and said collar means.

47. The blind bolt of claim 46 with said main sleeve structure and said expandable sleeve structure being separate members, said main sleeve structure having an elongated sleeve shank portion terminating at its inner end in a tapered nose portion, said sleeve shank portion adapted to be located in the aligned openings in the workpieces, said main sleeve structure having a first through bore adapted to receive said pin shank with said first bore having a central axis, said expandable sleeve structure having a second through bore adapted to receive said pin shank and being located on said pin shank between said pin head and said tapered nose portion, said tapered nose portion defining a preselected angle with said central axis, said expandable sleeve moving axially relative to and expanding radially over said nose portion in response to the relative axial force of said second magnitude to form an enlarged blind head for reacting against the blind side surface.

48. The blind bolt of claim 47 with said main sleeve structure being formed with said collapsible structure.

49. The blind bolt of claim 46 with said expandable sleeve structure having a weakened portion adapted to fold radially outwardly to form said blind head in a bulb form in response to the relative axial force of said second magnitude.

50. The blind bolt of claim 46 with said main sleeve structure and said expandable sleeve structure being separate members, said main sleeve structure having an elongated sleeve shank portion adapted to be located in the aligned openings in the workpieces, said main sleeve structure having a first through bore adapted to receive said pin shank, said expandable sleeve structure having a second through bore adapted to receive said pin shank and being located on said pin shank adjacent said pin head, said expandable sleeve structure having a weakened portion adapted to fold radially outwardly to form said blind head in a bulb form in response to the relative axial force of said second magnitude.

51. The blind bolt of claim 50 with said main sleeve structure being formed with said collapsible structure.

52. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure having an elongated sleeve shank portion adapted to be located in the aligned openings in the workpieces, said main sleeve structure having a first through bore adapted to receive said pin shank, an expandable sleeve member having a second through bore adapted to receive said pin shank and being located on said pin shank between said pin head and said main sleeve structure, a collar located on said pin shank at the accessible surface side of the workpieces and adapted to be swaged into said lock grooves in response to the relative axial force of a first magnitude applied by the installation tool between said pin and said collar, said expandable sleeve having a weakened portion adapted to collapse in response to the relative axial force of a second magnitude less than said first magnitude to form an enlarged blind head for reacting against the blind side surface, said main sleeve structure including a frangible portion, said frangible portion adapted to fracture at a third magnitude of relative axial force less than said first magnitude and greater than said second magnitude for moving said main sleeve structure out of an axial load bearing connection, whereby said blind head will engage the blind side surface such that the final clamp load applied to the workpieces will be substantially unaffected by said main sleeve structure.

53. A high strength blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a lock portion comprising a plurality of lock grooves and a pull portion comprising a plurality of pull grooves, a main sleeve structure having an elongated sleeve shank portion adapted to be located in the aligned openings in the workpieces, said main sleeve structure having a first through bore adapted to receive said pin shank, an expandable sleeve member having a second through bore adapted to receive said pin shank and being located on said pin shank between said pin head and said main sleeve structure, a collar located on said pin shank at the accessible surface side of the workpieces and adapted to be swaged into said lock grooves in response to the relative axial force of a first magnitude applied by the installation tool between said pin and said collar, said expandable sleeve having a weakened portion adapted to collapse in response to the relative axial force of a second magnitude less than said first magnitude to form an enlarged blind head for reacting against the blind side surface, said main sleeve structure being operable for initially transmitting the relative axial force between said pin member and said expandable sleeve to form said blind head and having a deformable portion responsive to the relative axial force of a third magnitude greater than said second magnitude and less than said first magnitude to deform to a position substantially out of load bearing relationship with said blind head to thereby prevent transmission of the relative axial force through said main sleeve structure whereby the final clamp load applied to the workpieces will be substantially unaffected by said main sleeve structure.

54. The high strength blind bolt of claim 53 with said deformable portion of said main sleeve structure including a frangible section adapted to fracture at said third magnitude of relative axial force.

55. The high strength blind bolt of claim 53 with said deformable portion of said main sleeve structure including a radially stepped structure defined by two sleeve portions connected by a frangible section with said frangible section adapted to fracture at said third magnitude of relative axial force to permit said stepped structure to axially move within itself.

56. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a securing position comprising a plurality of securing grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, an engaging member located on said pin shank at the accessible surface side of the workpieces and adapted to be engaged by the installation tool whereby a relative axial force of a first magnitude can be applied by the installation tool between said pin member and said engaging member to clamp the workpieces together at a relative axial force of a first magnitude, said tapered nose portion defining a preselected angle with said central axis, said expandable sleeve moving axially relative to and expanding radially over said nose portion in response to a relative axial force of a second magnitude less than said first magnitude to form an enlarged blind head for reacting against the blind side surface, said sleeve shank portion of said main sleeve structure terminating at its end opposite from said tapered nose portion in an enlarged counterbored portion, a grooved portion having an annular groove formed on the outer surface of said sleeve shank portion adjacent to said enlarged counterbored portion and adapted to move axially within said counterbored portion, a frangible portion connecting said enlarged counterbored portion with said annular grooved portion, said frangible portion adapted to fracture at a third magnitude of relative axial force less than said first magnitude and greater than said second magnitude with said grooved portion moving axially into said enlarged counterbored portion thereby moving said main sleeve structure out of axial load bearing engagement with said blind head, whereby said first magnitude of relative axial force and the final clamp load applied to the workpieces will b substantially unaffected by said main sleeve structure.

57. The blind bolt of claim 56 with said expandable sleeve member having a length within a range of from generally equal to slightly greater than the length of said tapered nose portion.

58. The blind bolt of claim 56 with said expandable sleeve member having a length greater than the length of said tapered nose portion by around the wall thickness of said expandable sleeve member.

59. The blind bolt of claim 56 with said annular groove and said enlarged counterbored portion having axial lengths selected to define the grip range of the fastener, where the grip range is defined as the difference between the minimum and maximum total thickness of the workpieces that a single fastener can secure together.

60. The blind bolt of claim 56 with said securing grooves
of said pin shank being defined by a helical thread form, said engaging member having a mating thread form adapted to be threadably engaged with said securing grooves whereby the relative axial force between said pin member and said engaging member is provided by the relative torque applied between said pin member and said engaging member.

61. The blind bolt of claim 56 with said securing grooves of said pin shank being defined by lock grooves, said engaging member being a swageable collar adapted to be located on said pin shank and to be swaged into said look grooves by the installation tool in response to the relative axial force of said first magnitude as applied by the installation tool.

62. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:
a pin member having an elongated pin shank terminating at one end in an enlarged pin head;
said pin shank having a securing portion comprising a plurality of securing grooves,
sleeve means including a main sleeve structure having an elongated sleeve shank portion, said sleeve shank portion adapted to be located in the aligned openings in the workpieces, said main sleeve structure adapted to receive said pin shank,
said sleeve means further comprising an expandable sleeve structure adapted to receive said pin shank and being located on said pin shank between said pin head and said main sleeve structure,
engaging means operatively connected with said sleeve means and including an engaging structure adapted to be engaged by the installation tool whereby a relative axial force of a first magnitude can be applied by the installation tool between said pin member and said engaging means to clamp the workpieces together at a relative axial force of a first magnitude,
said expandable sleeve structure being radially deformable in response to the relative axial force of a second magnitude less than said first magnitude to form a enlarged blind head for reacting against the blind side surface,
said sleeve means including a collapsible structure adapted to collapse at a third magnitude of relative axial force less than said first magnitude and greater than said second magnitude with said main sleeve structure moving out of an axial load bearing connection whereby said blind head will engage the blind side surface such that said first magnitude of relative axial force and the final clamp load applied to the workpieces will be substantially between said pin, said blind head and said engaging means.

63. The blind bolt of claim 62 with said main sleeve structure and said expandable sleeve structure being separate members,
said main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis,
said expandable sleeve structure having a second through bore adapted to receive said pin shank and being located on said pin shank between said pin head and said tapered nose portion,
said tapered nose portion defining a preselected angle with said central axis,
said expandable sleeve moving axially relative to and expanding radially over said nose portion in response to the relative axial force of said second magnitude to form an enlarged blind head for reacting against the blind side surface.

64. The blind bolt of claim 63 with said main sleeve structure being formed with said collapsible structure.

65. The blind bolt of claim 62 with said expandable sleeve structure having a weakened portion adapted to fold radially outwardly to form said blind head in a bulb form in response to the relative axial force of said second magnitude.

66. The blind bolt of claim 62 with said main sleeve structure and said expandable sleeve structure being separate members,
said main sleeve structure having an elongated sleeve shank portion adapted to be located in the aligned openings in the workpieces, said main sleeve structure having a first through bore adapted to receive said pin shank,
said expandable sleeve structure having a second through bore adapted to receive said pin shank and being located on said pin shank adjacent said pin head,
said expandable sleeve structure having a weakened portion adapted to fold radially outwardly to form said blind head in a bulb form in response to the relative axial force of said second magnitude.

67. The blind bolt of claim 66 with said main sleeve structure being formed with said collapsible structure.

68. The blind bolt of claim 62 with said securing grooves of said pin shank being defined by a helical thread form, said engaging member having a mating thread form adapted to be threadably engaged with said securing grooves whereby the relative axial force between said pin member and said engaging member is provided by the relative torque applied between said pin member and said engaging member.

69. The blind bolt of claim 62 with said securing grooves of said pin shank being defined by lock grooves, said engaging member being a swageable collar adapted to be located on said pin shank and to be swaged into said lock grooves by the installation tool in response to the relative axial force of said first magnitude as applied by the installation tool.

70. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a securing portion comprising a plurality of securing grooves, a main sleeve structure having an elongated sleeve shank portion terminating at an inner end in a tapered nose portion, said sleeve shank portion adapted to be located in the aligned openings in the workpieces, said main sleeve structure having a first through bore adapted to receive said pin shank with said first bore having a central axis, an expandable sleeve member having a second through bore adapted to receive said pin shank and being located on said pin shank between said pin head and said tapered nose portion, an engaging member located on said pin shank at the accessible surface side of the workpieces and adapted to be engaged by the installation tool whereby a relative axial force of a first magnitude can be applied by the installation tool between said pin member and said engaging member to clamp the workpieces together at a relative axial force of a first magnitude, said tapered nose portion defining a preselected angle with said central axis, said expandable sleeve moving axially relative to and expanding radially over said nose portion in response to a relative axial force of a second magnitude less than said first magnitude to form an enlarged blind head for reacting against the blind side surface, said sleeve shank portion of said main sleeve structure terminating at its end opposite from said tapered nose portion in an enlarged counterbored portion, a grooved portion having an annular groove formed on the outer surface of said sleeve shank portion adjacent to said enlarged counterbored portion and adapted to move axially within said counterbored portion, a frangible portion connecting said enlarged counterbored portion with said annular grooved portion, said frangible portion adapted to fracture at a third magnitude of relative axial force less than said first magnitude and greater than said second magnitude with said grooved portion moving axially into said enlarged counterbored portion thereby moving said main sleeve structure out of axial load bearing engagement with said blind head, whereby said first magnitude of relative axial force and the final clamp load applied to the workpieces will be substantially unaffected by said main sleeve structure, such expandable sleeve member being located generally in radial clearance relationship with the confronting surface of said pin shank, guide means operatively associated with said expandable sleeve member and said pin shank adjacent said pin head for holding said expandable sleeve member in a generally coaxial relationship with said pin shank after said main sleeve struction has moved out of axial load bearing engagement with said blind head.

71. The blind bolt of claim 70 with said guide means comprising an enlarged diameter portion on said pin shank adjacent to said pin head adapted to be engageable with the associated end of said expandable sleeve member.

72. The blind bolt of claim 70 with said guide means comprising an enlarged diameter tapered portion on said pin shank adjacent to said pin head adapted to be engageable with the associated end of said expandable sleeve member.

73. The blind bolt of claim 70 with said guide means comprising an enlarged diameter tapered portion on said pin shank adjacent to said pin head adapted to be engageable with the associated end of said expandable sleeve member said associated end of said expandable sleeve member, having a cooperating taper engageable with said tapered portion on said pin shank.

74. A blind bolt for securing a plurality of workpieces at a desired clamp load with the workpieces having aligned openings therein and having an accessible surface and a blind side surface and adapted to be installed by a relative axial force applied by an installation tool from the accessible surface side of the workpieces, said blind bolt comprising:

a pin member having an elongated pin shank terminating at one end in an enlarged pin head;

said pin shank having a securing portion comprising a plurality of securing grooves, sleeve means including a main sleeve structure having an elongated sleeve shank portion, said sleeve shank portion adapted to be located in the aligned openings in the workpieces, said main sleeve structure adapted to receive said pin shank, said sleeve means further comprising are expandable sleeve structure adapted to receive said pin shank and being located on said pin shank between said pin head and said main sleeve structure, engaging means operatively connected with said sleeve means and including an engaging structure adapted to be engaged by the installation tool whereby a relative axial force of a first magnitude can be applied by the installation tool between said pin member and said engaging means to clamp the workpieces together at a relative axial force of a first magnitude, said expandable sleeve structure being radially deformable in response to the relative axial force of a second magnitude less than said first magnitude to form an enlarged blind head for reacting against the blind side surface, said sleeve means including a collapsible structure adapted to collapse at a third magnitude of relative axial force less than said first magnitude and greater than said second magnitude with said main sleeve structure moving out of an axial load bearing connection whereby said blind head will engage the blind side surface such that said first magnitude of relative axial force and the final clamp load applied to the workpieces will be substantially between said pin, said blind head and said engaging means, such expandable sleeve member being located generally in radial clearance relationship with the confronting surface of said pin shank, guide means operatively associated with said expandable sleeve member and said pin shank adjacent said pin head for holding said expandable sleeve member in a generally coaxial relationship with said pin shank after said main sleeve struction has moved out of axial load bearing engagement with said blind head.

75. The blind bolt of claim 74 with said guide means comprising an enlarged diameter portion pin said pin shank adjacent to said pin head adapted to be engageable with the associated end of said expandable sleeve member.

76. The blind bolt of claim 74 with said guide means comprising an enlarged diameter tapered portion on said pin shank adjacent to said pin head adapted to be engageable with the associated end of said expandable sleeve member.

77. The blind bolt of claim 76 with said guide means comprising an enlarged diameter tapered portion on said pin shank adjacent to said pin head adapted to be engageable with the associated end of said expandable sleeve member said associated end of said expandable sleeve member having a cooperating taper engageable with said tapered portion on said pin shank.

* * * * *

UNITED STATES PATENT AND TRADEMARK OFFICE
CERTIFICATE OF CORRECTION

PATENT NO. : 5,213,460

DATED : May 25, 1993

INVENTOR(S) : Shahriar M. Sadri, Keith D. Nordyke and Mark R. Plunkett

It is certified that error appears in the above-identified patent and that said Letters Patent is hereby corrected as shown below:

Col. 1, line 15, after "fasteners" insert --and--.
Col. 9, delete lines 52-55.
Col. 10, line 7, delete "nos" and substitute --nose--.
Col. 13, line 36, delete "10a," second occurrence and substitute --10a'--.
Col. 13, line 38, delete "10a," and substitute --10a'--.
Col. 14, line 63, delete "D1c," and substitute --D1c'--.
Col. 18, line 3, delete "42f" and substitute --42f'--.
Col. 18, line 6, delete "10f" and substitute --10f'--.
Col. 19, line 55, delete "ad" and substitute --aid--.
Col. 23, line 13, Claim 6, delete "a nd" and substitute --and--.
Col. 28, line 64, Claim 27, delete "42TRc" and substitute --42Rc--.
Col. 39, line 13, Claim 56, delete "b" and substitute --be--.
Col. 40, line 10, Claim 62, delete "a" and substitute --an--.

Signed and Sealed this

Twenty-second Day of February, 1994

*Attest:*

BRUCE LEHMAN

*Attesting Officer*      *Commissioner of Patents and Trademarks*